US012601754B2

(12) United States Patent
Tanaka

(10) Patent No.: US 12,601,754 B2
(45) Date of Patent: Apr. 14, 2026

(54) MEMS DEVICE AND INERTIAL MEASUREMENT UNIT

(71) Applicant: SEIKO EPSON CORPORATION, Tokyo (JP)

(72) Inventor: Satoru Tanaka, Chino (JP)

(73) Assignee: SEIKO EPSON CORPORATION (JP)

( * ) Notice: Subject to any disclaimer, the term of this patent is extended or adjusted under 35 U.S.C. 154(b) by 395 days.

(21) Appl. No.: 18/497,041

(22) Filed: Oct. 30, 2023

(65) Prior Publication Data

US 2024/0142491 A1      May 2, 2024

(30) Foreign Application Priority Data

Oct. 31, 2022      (JP) ................................. 2022-174228

(51) Int. Cl.
*G01P 15/135* (2006.01)
*G01P 15/125* (2006.01)

(52) U.S. Cl.
CPC .......... *G01P 15/135* (2013.01); *G01P 15/125* (2013.01)

(58) Field of Classification Search
CPC .................................................... G01P 15/125
USPC ...................................................... 73/514.16
See application file for complete search history.

(56) References Cited

U.S. PATENT DOCUMENTS

2011/0254110 A1* 10/2011 Watanabe ............. B81B 3/0086
                                                              257/E29.324
2021/0065990 A1      3/2021 Fujimoto et al.

FOREIGN PATENT DOCUMENTS

JP          2021-032819 A      3/2021

* cited by examiner

*Primary Examiner* — Walter L Lindsay, Jr.
*Assistant Examiner* — Philip T Fadul
(74) *Attorney, Agent, or Firm* — Harness, Dickey & Pierce, P.L.C.

(57)          ABSTRACT

A MEMS device of an embodiment includes a substrate, fixed electrode portions, a movable body, fixed electrode fixing portions, a wiring structure, and a first wire. The fixed electrode portions are fixed relative to the substrate. The movable body is movable relative to the substrate. The fixed electrode fixing portions are electrically coupled to the fixed electrode portions. The wiring structure is provided in the same layer as those of the movable body and the fixed electrode portions with respect to the substrate. The first wire has one end coupled to the fixed electrode fixing portion. The wiring structure is at least provided in an opening part of the movable body, and the first wire is wired on the wiring structure via an insulating film and routed out of the movable body through the opening part of the movable body.

15 Claims, 21 Drawing Sheets

FIG. 2

CONFIGURATION A

CONFIGURATION B

MEMS DEVICE AND INERTIAL MEASUREMENT UNIT

The present application is based on, and claims priority from JP Application Serial Number 2022-174228, filed Oct. 31, 2022, the disclosure of which is hereby incorporated by reference herein in its entirety.

BACKGROUND

1. Technical Field

The present disclosure relates to a MEMS device, an inertial measurement unit, etc.

2. Related Art

JP-A-2021-032819 discloses a structure of a MEMS device detecting an acceleration in Z directions. In the structure, a length of a first electrode along first directions of one of a plurality of first electrodes is shorter than a length of a first conducting portion along first directions of the first conducting portion, and a length of a second electrode along first directions of one of a plurality of second electrodes is shorter than a length of a second conducting portion along first directions of the second conducting portion.

In the MEMS device disclosed in JP-A-2021-032819, in order to obtain excellent sensor characteristics, it is necessary to consider routing of wires to a movable electrode and a fixed electrode for detecting capacity.

SUMMARY

An aspect of the present disclosure relates to a MEMS device including a substrate, a fixed electrode portion fixed relative to the substrate, a movable body movable relative to the substrate, a fixed electrode fixing portion electrically coupled to the fixed electrode portion, a wiring structure provided in a same layer as those of the movable body and the fixed electrode portion with respect to the substrate, and a first wire having one end coupled to the fixed electrode fixing portion, wherein the wiring structure is at least provided in an opening part of the movable body, and the first wire is wired on the wiring structure via an insulating film and routed out of the movable body through the opening part of the movable body.

Further, another aspect of the present disclosure relates to an inertial measurement unit including the above described MEMS device, and a control unit performing control based on a detection signal output from the MEMS device.

BRIEF DESCRIPTION OF THE DRAWINGS

FIG. 2 shows an example of a motion of detection parts.

DESCRIPTION OF EMBODIMENTS

As below, embodiments will be explained. Note that the following embodiments do not unduly limit the description of What is Claimed is. Further, not all configurations described in the embodiments are necessarily essential component elements.

1. MEMS Device

Figure 1:
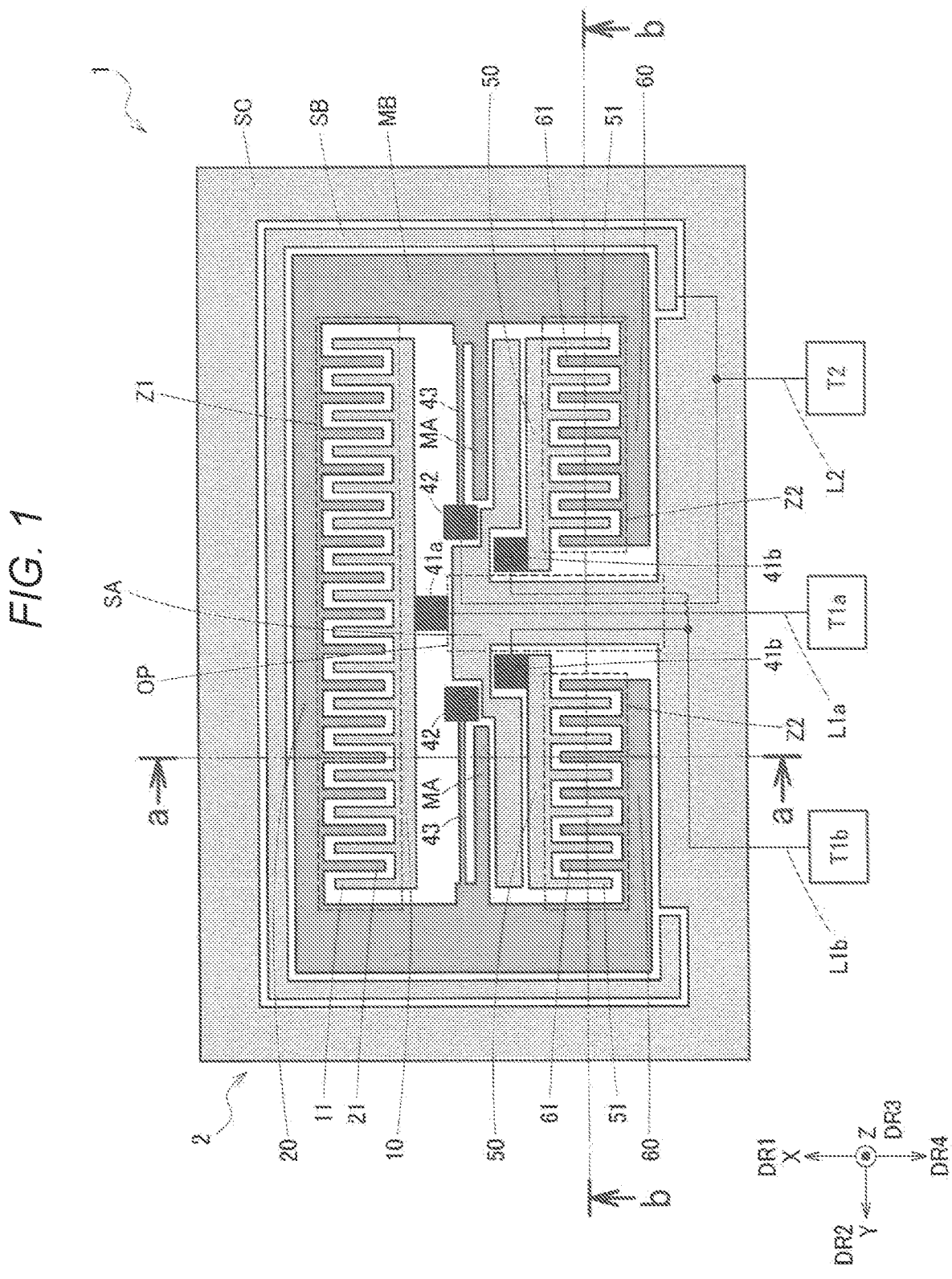
FIG. 1 is a plan view of a MEMS device of an embodiment.

A MEMS (Micro Electro Mechanical Systems) device 1 of the embodiment will be explained using an acceleration sensor detecting an acceleration in a vertical direction as an example. FIG. 1 is a plan view of the MEMS device 1 of the embodiment in a plan view in a direction orthogonal to a substrate 2. The MEMS device 1 is e.g., an inertial sensor.

Note that, in FIG. 1 and FIGS. 2, 4 to 6, and 7 to 18, which will be described later, for convenience of explanation, dimensions of respective members, distances between the members, etc. are schematically shown and not all component elements are shown. As below, a case where a physical quantity detected by the MEMS device 1 is an acceleration is mainly explained as an example, however, the physical quantity is not limited to the acceleration, but may be another physical quantity such as a velocity, pressure, displacement, attitude, angular velocity, or gravity force. Further, directions orthogonal to one another in FIG. 1 are a first direction DR1, a second direction DR2, and a third direction DR3. The first direction DR1, the second direction DR2, and the third direction DR3 are e.g., an X-axis direction, a Y-axis direction, and a Z-axis direction, respectively, however, not limited to those. For example, the third direction DR3 corresponding to the Z-axis direction is a direction orthogonal to the substrate 2 of the MEMS device 1 and the vertical direction. An opposite direction to the third direction DR3 is a fifth direction DR5. The first direction DR1 corresponding to the X-axis direction and the second direction DR2 corresponding to the Y-axis direction are directions orthogonal to the third direction DR3, an XY-plane as a plane along the first direction DR1 and the second direction DR2 are along e.g., a horizontal plane. An opposite direction to the first direction DR1 is a fourth direction DR4 and the fourth direction is e.g., the −X-axis direction. Note that "orthogonal" includes not only an intersection at 90° but also intersections at angles slightly inclined from 90°.

As shown in FIG. 1, the MEMS device 1 of the embodiment includes the substrate 2, fixed electrode portions 10, 50, a movable body MB, fixed electrode fixing portions 41a, 41b, a wiring structure SA, and first wires L1a, L1b. The fixed electrode portion 10 has a plurality of fixed electrodes 11 and the fixed electrode portion 50 has a plurality of fixed electrodes 51. The movable body MB includes movable electrode portions 20, 60. The movable electrode portion 20 of the movable body MB includes movable electrodes 21 and the movable electrode portions 60 include movable electrodes 61.

The substrate 2 is e.g., a silicon substrate formed using semiconductor silicon, a glass substrate formed using a glass material such as borosilicate glass, or the like. As the substrate 2, specifically, an SOI (Silicon On Insulator) substrate may be used. As will be described later in FIGS. 2, 4, and 9, an insulating layer I is provided on the silicon substrate and a structure layer of a silicon material or the like is provided in an upper layer thereof.

The movable body MB is movable relative to the substrate 2 with an acceleration or the like applied from outside in the MEMS device 1. As shown in FIG. 1, the MEMS device 1 may include supporting beams 43 and fixing portions 42, and the movable body MB is coupled to the substrate 2 via the supporting beams 43 and the fixing portions 42. The supporting beam 43 is e.g., a tortional spring. Further, as will be described later in FIG. 9, the fixing portion 42 is coupled to the substrate 2 via an insulating film D. One end of the supporting beam 43 is coupled to the fixing portion 42 and the other end thereof is coupled to the movable body MB.

As described above, the MEMS device 1 of the embodiment includes the supporting beams 43 with one ends coupled to the fixing portions 42 and the other ends coupled to the movable body MB. The fixing portions 42 are electrically coupled to the movable body MB via the supporting beams 43. According to the configuration, the supporting beams 43 twist according to the acceleration or the like applied from outside, and thereby, the movable body MB may make a see-saw motion with respect to the substrate 2.

Figure 2:
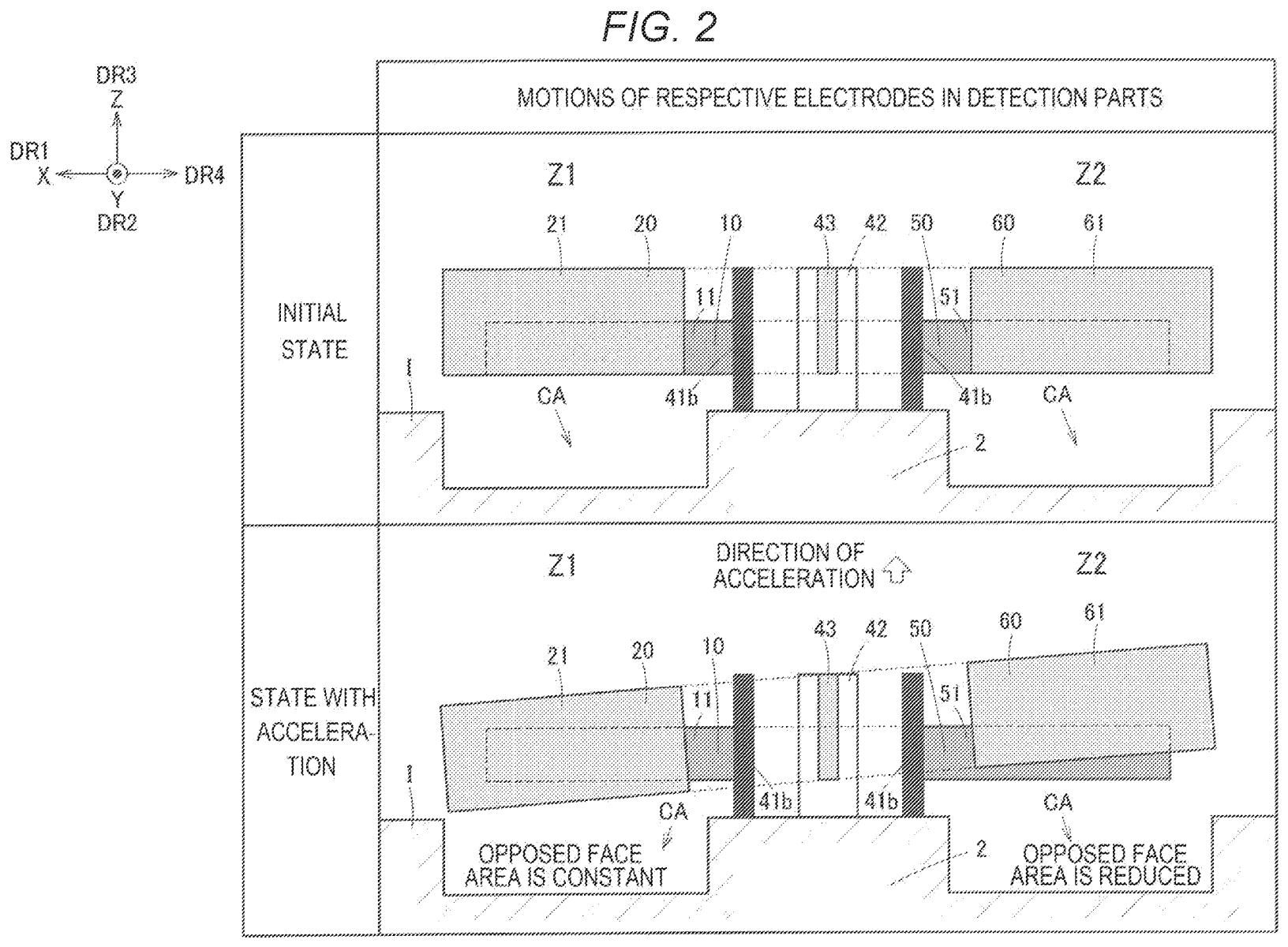

As shown in FIG. 2 etc., cavities CA are provided at the side in the −Z direction of the movable body MB, i.e., at the side in the opposite direction to the third direction DR3. The cavity CA is a space of a part of the substrate 2 recessed toward the −Z direction, i.e., the side in the opposite direction to the third direction DR3. By the cavities CA provided in the substrate 2, the movable body MB may may make a see-saw motion without contacting the substrate 2. Note that the movable body MB is not necessarily directly coupled to the substrate 2, but, for example, in a gyro sensor to be described in FIG. 19 or the like, coupled to the substrate 2 via a vibrator.

The fixed electrode portions 10, 50 serve to detect an acceleration in the MEMS device 1 with the movable electrode portions 20, 60 of the movable body MB. As shown in FIG. 2, the fixed electrode portions 10, 50 are fixed relative to the substrate 2. As shown in FIG. 1, at the side in the first direction DR1 of the MEMS device 1, the plurality of fixed electrodes 11 of the fixed electrode portion 10 are provided to face the plurality of movable electrodes 21 of the movable electrode portion 20. Further, at the side in the fourth direction DR4 of the MEMS device 1, the plurality of fixed electrodes 51 of the fixed electrode portion 50 are provided to face the plurality of movable electrodes 61 of the movable electrode portion 60. As described in FIG. 2, the fixed electrode 11, the movable electrode 21, the fixed electrode 51, and the movable electrode 61 are plate-like shapes along the third direction DR3 and these electrodes are placed to face each other. Furthermore, the fixed electrode 11 and the movable electrode 21, and the fixed electrode 51 and the movable electrode 61 are configured to respectively serve as probes and detect a physical quantity such as an acceleration.

That is, in the embodiment, the fixed electrode portions 10, 50 include the fixed electrodes 11, 51 facing the movable electrodes 21, 61 provided in the movable body MB. According to the configuration, in the MEMS device 1, the probes detecting a physical quantity may be formed. Note that, hereinafter, the fixed electrodes 11, 51 and the movable electrodes 21, 61 are appropriately and collectively referred to as "probe electrodes".

Further, an area where the fixed electrodes 11 and the movable electrodes 21 face to form the probes is referred to as "detection part Z1" and an area where the fixed electrodes 51 and the movable electrodes 61 face to form the probes is referred to as "detection part Z2". As described above, in the MEMS device 1 of the embodiment, at least one or more detection parts are provided by the fixed electrodes 11, 51 and the movable electrodes 21, 61 and, in the example shown in FIG. 1, the detection part Z1 is provided at the side in the first direction DR1 in the plan view and the detection part Z2 is provided at the side in the fourth direction DR4 in the plan view. Note that, hereinafter, the detection part Z1 and the detection part Z2 are appropriately collectively referred to as "respective detection parts".

The fixed electrode fixing portion 41a fixes the fixed electrode portion 10 and the fixed electrode fixing portions 41b fix the fixed electrode portions 50 respectively to the substrate 2. As shown in FIG. 2, one end of the fixed electrode fixing portion 41a is coupled to the substrate 2 and another part thereof is coupled to the fixed electrode portion 10. Further, one ends of the fixed electrode fixing portions 41b are coupled to the substrate 2 and other portions thereof are coupled to the fixed electrode portions 50. As described above, the fixed electrodes 11 of the fixed electrode portion 10 and the fixed electrodes 51 of the fixed electrode portions 50 are fixed in certain positions with respect to the substrate 2. Note that the fixed electrode fixing portion 41a is also electrically coupled to the fixed electrode portion 10 and the fixed electrode fixing portions 41b are also electrically coupled to the fixed electrode portions 50. Further, the fixed electrode fixing portions 41a, 41b may have cantilevered structures or fixed to the substrate 2 to the bases of the fixed electrode portions 10, 50. As shown in FIG. 1, in the MEMS device 1 of the embodiment, the fixing portions 42 and the fixed electrode fixing portions 41a, 41b are placed concentratedly near the center of the MEMS device 1 in the plan view. Note that, hereinafter, the fixed electrode fixing portion 41a and the fixed electrode fixing portions 41b are appropriately collectively referred to as "fixed electrode fixing portions 41".

Figure 9:
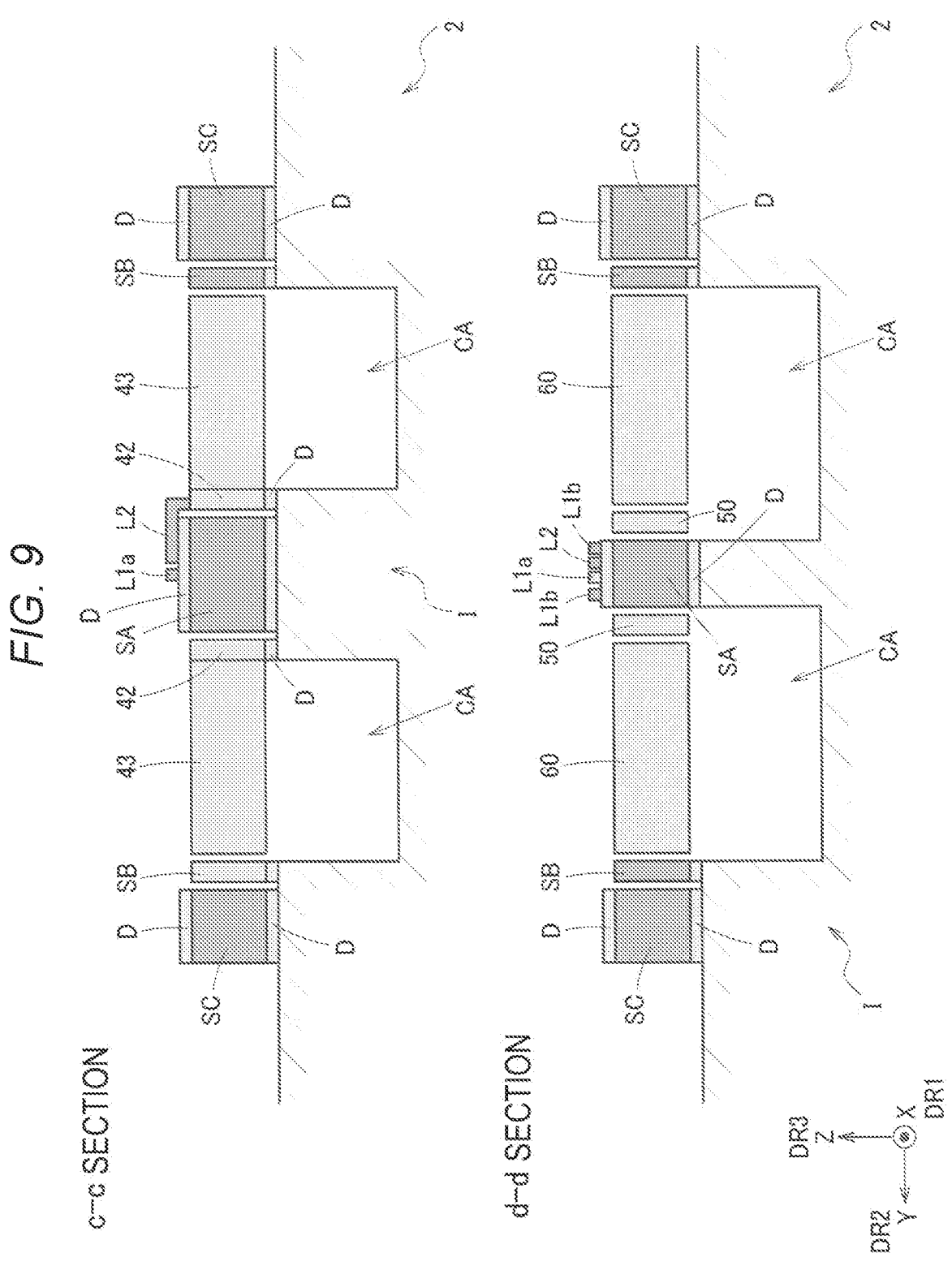
FIG. 9 is a schematic diagram of section structures of the first detailed example.

Further, the MEMS device 1 of the embodiment may include a stopper structure SB and a shield structure SC. The stopper structure SB suppresses an excessive motion of the movable body MB. The stopper structure SB is configured to surround the movable body MB by at least three sides in the plan view as shown in FIG. 1. In the example shown in FIG. 1, the stopper structure SB has a shape surrounding by the three sides of the movable body MB at the side in the first direction DR1, the side in the second direction DR2, and the side in the opposite direction to the second direction DR2. For example, when excessively displaced toward the side in the first direction DR, the movable body MB collides with a configuration portion provided along the second direction DR2 of the stopper structure SB, and thereby, the excessive displacement is suppressed. Excessive displacements in the other directions are suppressed in the same manner. The stopper structure SB may be formed using a conductive material e.g., impurity-doped silicon. Further, as shown in FIG. 9 to be described later, the stopper structure SB is provided on the substrate 2 via the insulating film D and insulated from the substrate 2. As shown in FIG. 9 to be described later, the stopper structure SB is provided in the same layer as those of the probe electrodes including the fixed electrodes 11, 51 and the movable electrodes 21, 61 in the sectional view. Here, the same layer refers to the same level at which the height in the third direction DR3 with respect to the substrate 2 is shown in the sectional view of the MEMS device 1. That is, the stopper structure SB is provided in the same layer as those of the probe electrodes even when the height thereof in the third direction DR3 with respect to the substrate 2 is not equal to those of the probe electrodes as long as the height falls within a certain range.

The shield structure SC electrically shields the movable body MB and the stopper structure SB from outside. As shown in FIG. 1, the shield structure SC is configured to further surround the stopper structure SB surrounding the movable body MB in the plan view. The shield structure SC is set at e.g., the ground potential. The shield structure SC is set at the ground potential, and thereby, external electric and magnetic influences may be suppressed, the movable body MB and the stopper structure SB inside of the shield structure SC may be maintained to be electrically and magnetically stable, and high-accuracy physical quantity detection can be realized in the detection parts Z1, Z2. The shield structure SC may be formed using a conductive material e.g., impurity-doped silicon like the stopper structure SB. The shield structure SC is also provided on the substrate 2 via the insulating film D in the same layer as those of the probe electrodes in the sectional view. Note that, hereinafter, the stopper structure SB and the shield structure SC provided outside of the movable body MB are appropriately collectively referred to as "structure SBC".

The first wires L1*a*, L1*b* transmit the detection signals of the fixed electrode portions 10, 50 to fixed electrode terminals T1*a*, T1*b*, respectively. One end of the first wire L1*a* is coupled to the fixed electrode fixing portion 41*a* and the other end thereof is coupled to the fixed electrode terminal T1*a*. The first wire L1*a* transmits the signal detected by the fixed electrode portion 10 in the detection part Z1 to the fixed electrode terminal T1*a*. Further, one ends of the first wires L1*b* are coupled to the fixed electrode fixing portions 41*b* and the other ends thereof are coupled to the fixed electrode terminal T1*b*. Conductive materials may be used for the first wires L1*a*, L1*b*, and the first wires are provided on the wiring structure SA via the insulating film D, for example, as shown in FIG. 9 etc. The first wires L1*b* transmit the signals detected by the fixed electrode portions 50 in the detection part Z2 to the fixed electrode terminal T1*b*. Note that, hereinafter, the first wires L1*a*, L1*b* are appropriately collectively referred to as "first wires L1".

In the embodiment, as shown in FIG. 1, a second wire L2 and a movable electrode terminal T2 may be provided. The second wire L2 electrically couples the above described fixing portions 42 and the movable electrode terminal T2. The fixing portions 42 have roles of anchors for the movable body MB and are electrically coupled to the movable body MB. The movable body MB includes the movable electrodes 21, 61 of the movable electrode portions 20, 60. Therefore, the movable electrodes 21, 61 of the movable electrode portions 20, 60 are electrically coupled to the movable electrode terminal T2 via the second wire L2. A conductive film may be used for the second wire L2 like the first wires L1 and the second wire is provided on the wiring structure SA via the insulating film D.

That is, the MEMS device 1 of the embodiment includes the fixing portions 42 electrically coupled to the movable body MB and the second wire L2 having the one end coupled to the fixing portions 42. The second wire L2 is wired on the wiring structure SA via the insulating film D and routed out of the movable body MB through an opening part OP of the movable body MB. According to the configuration, voltages of the movable electrodes 21, 61 of the movable body MB may be controlled by a voltage applied to the movable electrode terminal T2. Note that, hereinafter, the first wires L1*a*, L1*b* and the second wire L2 are appropriately collectively referred to as "respective wires".

The wiring structure SA is a structure provided in the opening part OP of the movable body MB. As shown in FIG. 1, the opening part OP is an area opened from the vicinity of the center of the movable body MB to the outside of the movable body MB in the plan view. Here, the direction outward from the center is the fourth direction DR4 in the example shown in FIG. 1, however, may be any direction. The wiring structure SA is provided at least in the opening part OP in the plan view. In the configuration example shown in FIG. 1, the wiring structure SA is provided not only in the opening part OP but also along the fixed electrode portions 50. As described above, the wiring structure SA is provided at least in the opening part OP and may be optionally provided in another area. Further, the wiring structure SA is provided in the same layer as those of the fixed electrodes 11, 51, the movable electrodes 21, 61, the stopper structure SB, and the shield structure SC in the sectional view as shown in FIG. 9 to be described later. Furthermore, the wiring structure SA is provided between the wires including the first wires L1, the second wire L2, etc. in the upper layer and the substrate 2 in the lower layer via the insulating film D. Therefore, the wiring structure SA is electrically insulated from the wires provided in the upper layer and the substrate in the lower layer. The wiring structure SA may be formed using a conductive material e.g., impurity-doped silicon like the stopper structure SB and the shield structure SC. Note that, hereinafter, the same layer as those of the movable body MB, the wiring structure SA, the stopper structure SB, the shield structure SC, etc. is referred to as "structure layer". The wiring structure SA is integrally formed with the shield structure SC.

As described above, according to the MEMS device 1 of the embodiment, in a capacitive device formed using the cavity SOI process, the respective wires including the first wires L1, the second wire L2, etc. are provided on the wiring structure SA via the insulating layer D, and the fixed electrode fixing portions 41*a*, 41*b* as the anchors for the fixed electrode portions 10, 50 are located inside of the movable body MB in the plan view. Further, the respective wires may be routed from the opening part OP provided in the movable body MB. Further, for example, the stopper structure SB at the same potential as that of the movable body MB is placed around the three or more sides of the movable body MB. The wiring structure SA provided within the opening part OP is fixed at the ground or the same potential as that of the movable body MB.

Next, a basic motion of the MEMS device 1 is explained. FIG. 2 shows sectional views of the MEMS device 1 along a dotted line a in FIG. 1. Note that, in FIG. 2, the description of the component elements unnecessary for explanation of the basic motion of the MEMS device 1 is omitted. In FIG. 2, the sectional view in an initial state is shown in the upper part and the sectional view in a state with an acceleration is shown in the lower part.

First, the initial state shown in the upper part of FIG. 2 is a resting state and the movable electrode 21 provided in the detection part Z1 and the movable electrode 61 provided in the detection part Z2 rest in the positions at the same height relative to the substrate 2. In this regard, the opposed face area of the fixed electrode 11 and the movable electrode 21 in the detection part Z1 and the opposed face area of the fixed electrode 51 and the movable electrode 61 in the detection part Z2 are equal.

The state with an acceleration shown in the lower part in FIG. 2 is a state with an acceleration in the third direction DR3, i.e., the +Z direction. Here, in the MEMS device 1 shown in FIG. 1, the opening part OP is provided at the side in the fourth direction DR4 of the supporting beams 43 as a rotation axis of the movable body MB and inertia moment of the movable body MB is smaller at the side in the fourth direction DR4 of the supporting beams 43. Therefore, when an acceleration in the +Z direction is applied, the movable electrode 21 provided at the side in the first direction DR1 and having higher rotation sensitivity is subjected to an inertial force in the opposite direction to that of the acceleration and displaced toward the opposite direction to the third direction DR3, i.e., the −Z direction. Further, the movable electrode 61 provided at the side in the fourth direction DR4 of the supporting beams 43 is displaced in the +Z direction as the opposite direction to that of the movable electrodes 21. In this case, as shown in the lower part of FIG. 2, the opposed face area of the fixed electrode 11 and the movable electrode 21 is maintained substantially constant in the detection part Z1, and the opposed face area of the fixed electrode 51 and the movable electrode 61 decreases in the detection part Z2. On the other hand, when an acceleration in the −Z direction is applied, the movable electrode 21 at the side of the larger inertial moment is subjected to an inertial force in the +Z direction and displaced in the +Z direction and the movable electrode 61 is displaced in the same direction as that of the acceleration, and thereby, the opposed face area of the probe electrodes decreases in the detection part Z1 and the opposed face area of the probe electrodes is maintained substantially constant in the detection part Z2. As described above, when an acceleration in either the +Z direction or the −Z direction is generated in the MEMS device 1, the opposed face area changes in either the detection part Z1 or Z2.

Figure 3:
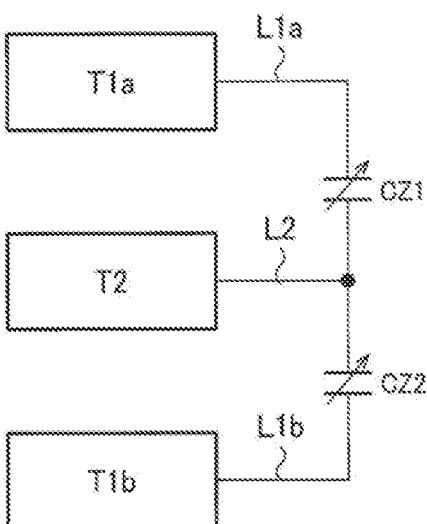
FIG. 3 is a schematic diagram of a measurement system of the MEMS device of the embodiment.

FIG. 3 schematically shows a measurement system of the MEMS device 1. As described in FIG. 2, the MEMS device 1 of the embodiment detects a physical quantity such as an acceleration as e.g., a change of the opposed face area of the probe electrodes. Further, the opposed face area of the probe electrodes may be detected as e.g., a change of capacitance. In FIG. 3, a capacitance CZ1 corresponds to a capacitance of a capacitor formed by the probe electrodes provided in the detection part Z1 and a capacitance CZ2 corresponds to a capacitance of a capacitor formed by the probe electrodes provided in the detection part Z2. The fixed electrodes 11 in the detection part Z1 are coupled to the fixed electrode terminal T1a via the first wire L1a, and the movable electrodes 21 in the detection part Z1 are coupled to the movable electrode terminal T2 via the second wire L2. The fixed electrodes 51 in the detection part Z2 are coupled to the fixed electrode terminal T1b via the first wires L1b, and the movable electrodes 61 in the detection part Z2 are coupled to the movable electrode terminal T2 via the second wire L2.

That is, the MEMS device 1 of the embodiment includes the fixed electrode terminals T1a, T1b coupled to the first wires L1a, L1b and the movable electrode terminal T2 coupled to the second wire L2. According to the configuration, the capacitance CZ1 in the detection part Z1 and the capacitance CZ2 in the detection part Z2 may be detected from the fixed electrode terminals T1a, T1b and the movable electrode terminal T2.

Figure 4:
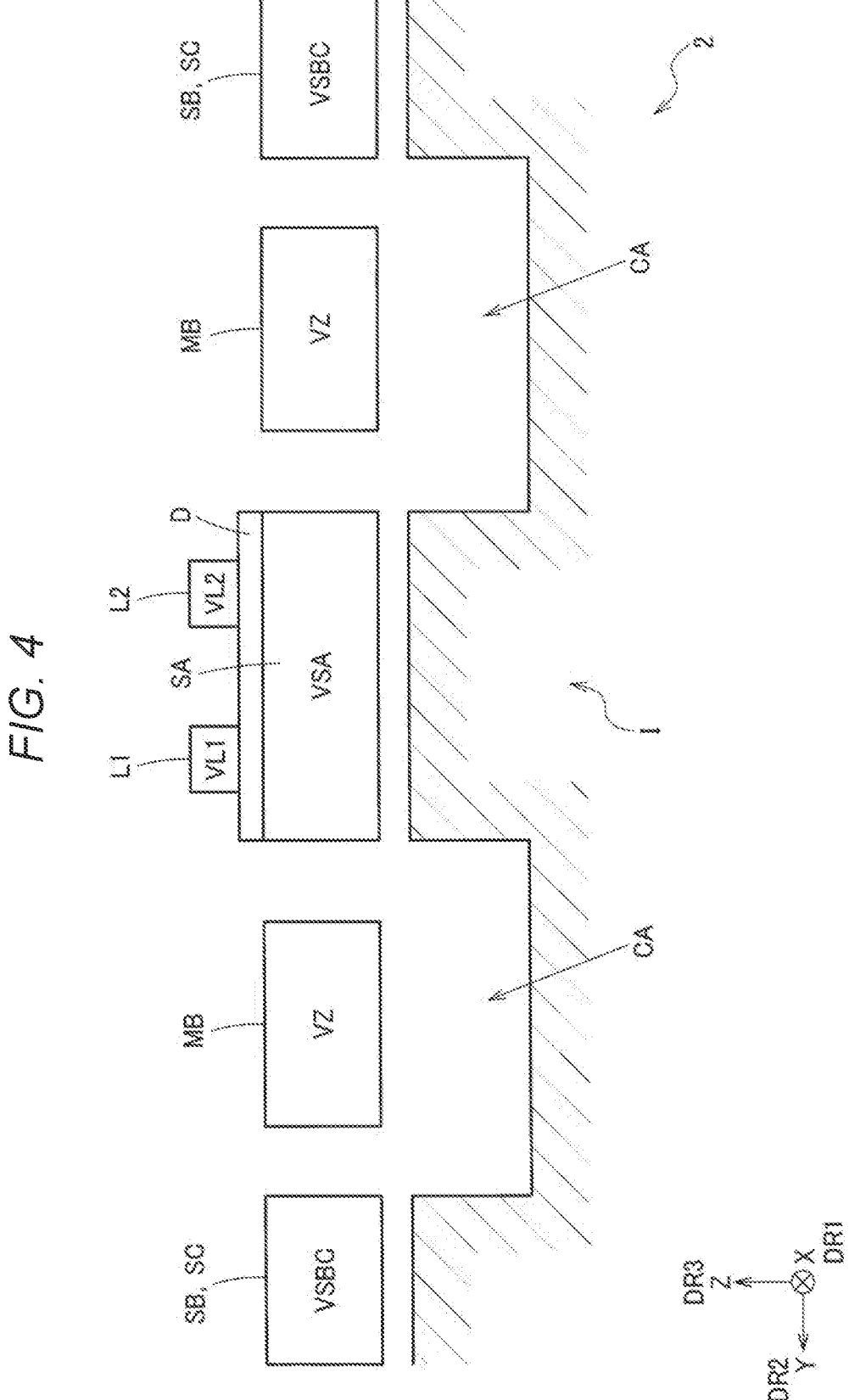
FIG. 4 is a diagram for explanation of a potential relationship among respective component elements of the MEMS device of the embodiment.

FIG. 4 is a diagram for explanation of a potential relationship among the respective component elements regarding the MEMS device 1 of the embodiment. Specifically, FIG. 4 shows the potential relationship among the respective component elements in a schematic sectional view along a dashed-dotted line b in FIG. 1. Note that, in FIG. 4, the individual component elements are schematically shown. For example, the first wire L1a and the first wires L1b are collectively shown as one first wire L1. Further, the stopper structure SB and the shield structure SC provided outside of the movable body MB may take various placement patterns as will be described in FIG. 15 and the subsequent drawings, and these structures are collectively referred to as the structure SBC. As shown in FIG. 4, the potentials of the first wire L1 and the second wire L2 are VL1 and VL2, the potential of the wiring structure SA is VSA, the potential of the movable body MB is VZ, the potential of the structure SBC provided outside of the movable body MB is VSBC. In the embodiment, when the capacitance is detected, applied voltages may be controlled with respect to not only the potentials VL1, VL2 of the respective wires and the potential VZ of the movable body MB but also the potential VSA of the wiring structure SA and the potential VSBC of the structure SBC provided outside of the movable body MB. For example, the potential VSA of the wiring structure SA may be set to the ground or the same potential as that of the movable body MB. As described above, in the embodiment, the physical quantity detection is performed using not only the potential control of the probe electrodes of the fixed electrodes 11, 51, the movable electrodes 21, 61, etc. directly used for the physical quantity detection but also the potential control of the wiring structure SA adjacent thereto, the stopper structure SB, the shield structure SC, etc. provided outside of the movable body MB.

Figure 5:
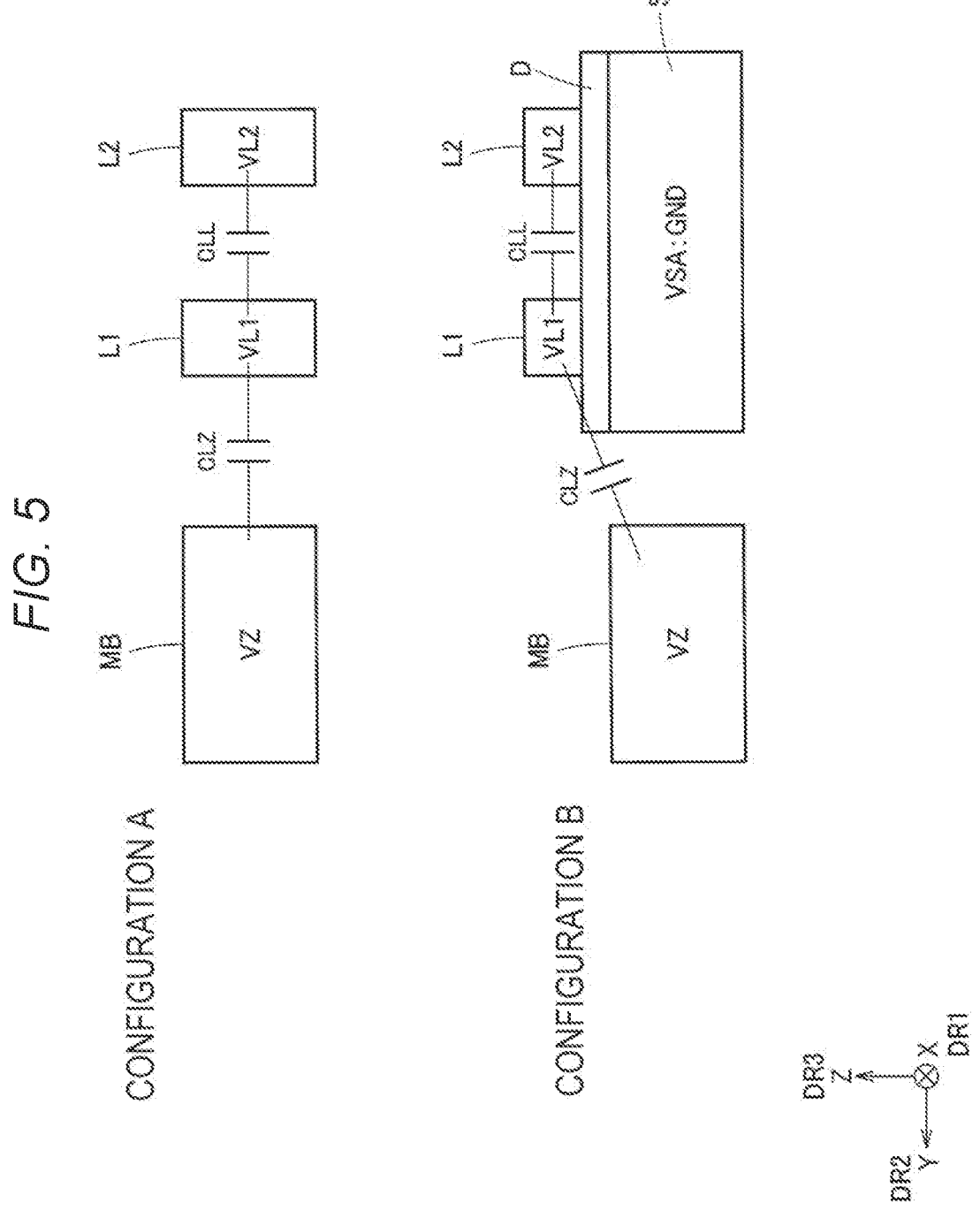
FIG. 5 is a schematic diagram of section structures of the MEMS device of the embodiment and a comparative example.
Figure 6:
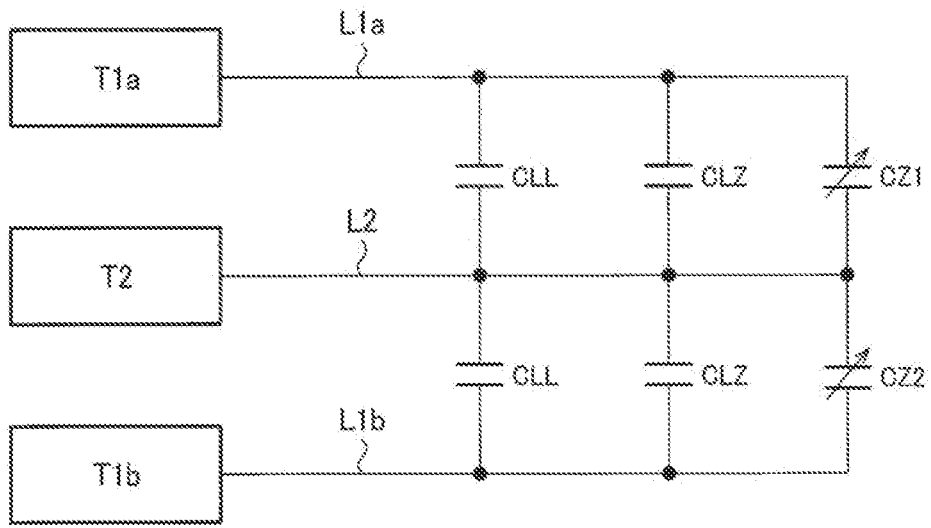
FIG. 6 is a diagram for explanation of an influence of parasitic capacitances in the measurement system of the embodiment.

FIGS. 5 and 6 are diagrams for explanation of the MEMS device 1 of the embodiment by comparisons with a comparative example thereof. FIG. 5 shows a schematic diagram of a section structure of the MEMS device 1 along the dashed-dotted line b in FIG. 1 and the comparative example thereof. Note that, regarding FIG. 5, like FIG. 4, the individual component elements are schematically shown and not all component elements are displayed. A configuration A shown in the upper part of FIG. 5 is an example in which the wiring structure SA is not provided in the opening part OP like that in the MEMS device 1 of the embodiment and the respective wires of the first wire L1 and the second wire L2 are provided in the same layer as those of the detection parts Z1, Z2. A configuration B shown in the lower part of FIG. 5 corresponds to the embodiment. In the sectional shape of the configuration B, the wiring structure SA is provided in the opening part OP as described above, and the respective wires are placed thereon via the insulating layer D. In the configuration B, the potential of the wiring structure SA is controlled to be a fixed potential e.g., the ground.

As described in FIG. 3, in the embodiment, a physical quantity such as an acceleration is detected based on the capacitances CZ1, CZ2 between the probe electrodes in the detection parts Z1, Z2, and other capacitances than the capacitances CZ1, CZ2 are generated between the respective component elements. For example, in both the configuration A and the configuration B in FIG. 5, a capacitive coupling CLZ is generated between the first wire L1 and the movable body MB and a capacitive coupling CLL is generated between the first wire L1 and the second wire L2. FIG. 6 shows how the capacitive couplings CLZ, CLL described in FIG. 5 appear in the measurement system of the MEMS device 1 of the embodiment described in FIG. 3. As shown in FIG. 6, the capacitive couplings CLZ, CLL are generated in parallel to the capacitances CZ1, CZ2.

As described above, in addition to the capacitances in the probe electrodes used for physical quantity detection, the capacitive couplings CLZ and the capacitive couplings CLL are generated. It is necessary to consider the influences on the physical quantity detection by these capacitive couplings in the MEMS device 1. Regarding the capacitive coupling CLL, when the respective wires are provided in the same layer as those of the respective structures like those in the configuration A, the sections of the respective wires are larger and the capacitive coupling CLL is larger. On the other hand, according to the configuration B, the respective wires are provided on the wiring structure SA via the insulating layer D and, compared to the sections of the configuration A, the sections of the respective wires may be made smaller. Therefore, the capacitive couplings CLL and the capacitive couplings CLZ between the respective wires and the movable body MB are smaller and the influences on the physical quantity detection in the MEMS device 1 may be suppressed.

Figure 7:
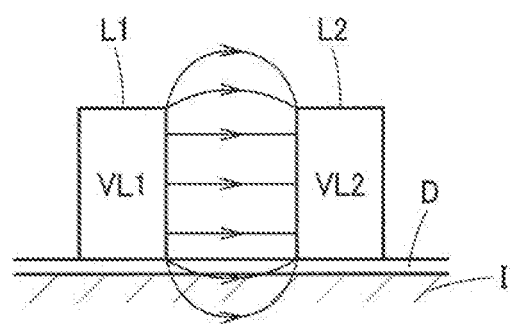
FIG. 7 is a diagram for explanation of influences of fringe electric fields between wires in comparison.
Figure 7:
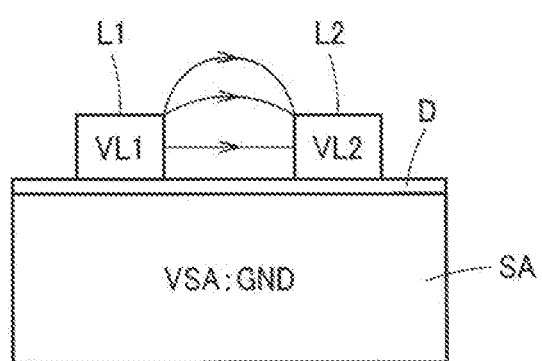
Figure 7:
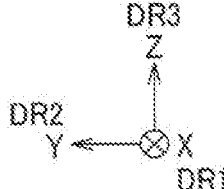

FIG. 7 is a sectional view of the respective wires and the wiring structure SA as seen at the side in the first direction DR1. Electric fields generated between the first wire L1 and the second wire L2 include electric fields parallel to the horizontal plane and fringe electric fields generated to come around from the upper end or the lower end of the wires. Here, the fringe electric fields are compared between the configuration A and the configuration B. In the configuration A, the fringe electric fields according to dielectric constants of the materials between wires are generated at both the upper end side and the lower end side of the respective wires, and accordingly, capacitance couplings based on the fringe electric fields are generated. On the other hand, in the configuration B, the electric fields are the same at the upper end side of the respective wires as the configuration A, however, at the lower end side of the respective wires, generation of the fringe electric fields may be suppressed because the conductive material such as silicon is used as the wiring structure SA. Thereby, the capacitance couplings between the respective wires with the fringe electric fields may be suppressed. Therefore, the first wire L1 and the second wire L2 are not directly provided in the same layer as those of the respective detection parts as in the configuration A, but the respective wires are provided on the conductive wiring structure SA as in the configuration B, and thereby, the fringe electric fields around the lower end side of the respective wires may be suppressed and unnecessary capacitance couplings may be suppressed. Here, when the wiring structure SA is set to be floated, the wiring structure SA is electrically charged and an unnecessary and uncontrollable electrostatic force is generated between the movable body MB and itself. Therefore, a configuration in which the wiring structure SA is set at a predetermined potential such as the ground is employed like the configuration B, and thereby, the above described defect may be suppressed. The wiring structure SA is set at a predetermined potential such as the ground like the configuration B, and thereby, an effect of suppressing not only the capacitive couplings CLL by the fringe electric fields between the wires but also the capacitive couplings CLZ between the respective wires and the movable body MB may be obtained. Note that, as above, the case where an out-of-plane rotation physical quantity sensor is provided inside of the stopper structure SB is explained as an example, however, the same effect may be obtained in cases where various physical quantity sensors are provided.

In the MEMS device disclosed in JP-A-2021-032819, as a technique of making contact between the probe electrodes and terminals, TSV (Through Silicon Via) may be employed. Specifically, pads are provided directly above the structure layer fixed to the substrate and the contact with the pads may be made by vias across the layers. When the TSV is employed, it is necessary to increase the areas of the anchors as the fixing portions of the structure for contact with the pads and it is not easy to concentratedly place the anchors in a part within the MEMS device. Further, problems of fluctuations in characteristics and increase in cost due to junction stress of the contact are caused. As described above, the TSV may avoid the problems of increase in element area due to routing of wires because the contact with the probe electrodes may be made by via contact, however, concentrated placement of the anchors in a part is difficult. If the anchors are dispersedly provided, the anchors are susceptible to the influence of warpage of the substrate due to external stress and temperature changes and the detection characteristics of the MEMS device are degraded. In this regard, in the embodiment, the TSV is not employed, but the opening part OP extending around from the vicinity of the center of the MEMS device 1 is provided and the respective wires are collectively placed on the wiring structure SA provided in the opening part OP, and thereby, the wiring efficiency is increased. Without using the TSV, the anchors may be concentratedly placed near the center of the MEMS device 1 and the anchors are less susceptible to the influence of warpage of the substrate 2 due to external stress and temperature changes. Therefore, the high-accuracy MEMS device 1 may be realized.

That is, the MEMS device 1 of the embodiment includes the substrate 2, the fixed electrode portions 10, 50, the movable body MB, the fixed electrode fixing portions 41, the wiring structure SA, and the first wire L1. The fixed electrode portions 10, 50 are fixed relative to the substrate 2. The movable body MB is movable relative to the substrate 2. The fixed electrode fixing portions 41 are electrically coupled to the fixed electrode portions 10, 50. The wiring structure SA is provided in the same layer as those of the movable body MB and the fixed electrode portions 10, 50 with respect to the substrate 2. One end of the first wire L1 is coupled to the fixed electrode fixing portions 41. The wiring structure SA is provided at least in the opening part OP of the movable body MB and the first wire L1 is wired on the wiring structure SA via the insulating film D and routed out of the movable body MB through the opening part OP of the movable body MB.

According to the configuration, in the MEMS device 1 formed using the SOI process or the like, the first wire L1 is provided in the same layer as that of the wiring structure SA via the insulating film D, the anchors of the fixed electrode portions 10, 50 are located inside of the movable body MB, and the wires may be routed from within the opening part OP provided in the movable body MB. Accordingly, the wiring efficiency may be increased and the area assigned to the probe electrodes in the plan view may be increased. Therefore, downsizing is easier than the MEMS device 1 having the same size and the same sensitivity. Further, when an out-of-plane rotation physical quantity sensor is provided inside of the stopper structure SB, the opening part is provided at the movable body MB side with smaller rotation torque and the wires are routed, and thereby, the rotation torque is increased and higher sensitivity and further downsizing can be realized.

In the embodiment, the wiring structure SA is set at the ground potential. According to the configuration, degradation of capacitance offsets due to generation of an unnecessary capacitance between the fixed electrode portion 10 and the movable electrode portion 20 or the fixed electrode portion 50 and the movable electrode portion 60 may be suppressed and high-accuracy physical quantity detection can be performed.

Further, in the embodiment, the potential VSA of the wiring structure SA may be set to the same potential as that of the movable body MB. The potential of the movable body MB is e.g., the potential of the movable electrode portions 20, 60.

That is, in the embodiment, the wiring structure SA is set at the same potential as that of the movable body MB. According to the configuration, the movable electrode portions 20, 60 and the wiring structure SA are at the same potential, and thereby, no capacitance is generated between the movable electrode portions 20, 60 and the wiring structure SA, an unnecessary capacitance component parasitic in the capacitance in the probe electrodes may be reduced, and the high-accuracy MEMS device 1 may be realized.

The MEMS device 1 of the embodiment includes the shield structure SC provided to surround the movable body MB and set at the ground potential. The wiring structure SA is integrally formed with the shield structure SC.

According to the configuration, external electric and magnetic influences on the MEMS device 1 may be blocked and the high-accuracy physical quantity detection can be performed. Further, the wiring structure SA is integrally formed with the shield structure SC, and thereby, the potential of the wiring structure SA may be constantly fixed to the ground potential. The first wire L1, the second wire L2, etc. provided in the upper layer of the wiring structure SA are electrically stabilized and the high-accuracy physical quantity detection can be performed.

In the embodiment, the movable body MB, the fixed electrode portions 10, 50, and the wiring structure SA are formed using silicon. According to the configuration, the movable body MB and the fixed electrode portions 10, 50 may be formed using silicon having conductivity. Therefore, the physical quantity such as a capacitance can be detected in the probes. Further, the wiring structure SA may be formed using silicon having conductivity, and the potential of the lower portions of the respective wires may be fixed to certain potentials by control of the potential of the wiring structure SA. Therefore, propagations of the electrical signals of the respective wires may be stabilized and the high-accuracy physical quantity detection can be performed. Further, all of the movable body MB, the fixed electrode portions 10, 50, and the wiring structure SA are formed in the same layer and these are formed using the same silicon, and thereby, deposition and processing may be collectively performed and the manufacturing process may be simplified.

2. Detailed Configuration Examples

Figure 8:
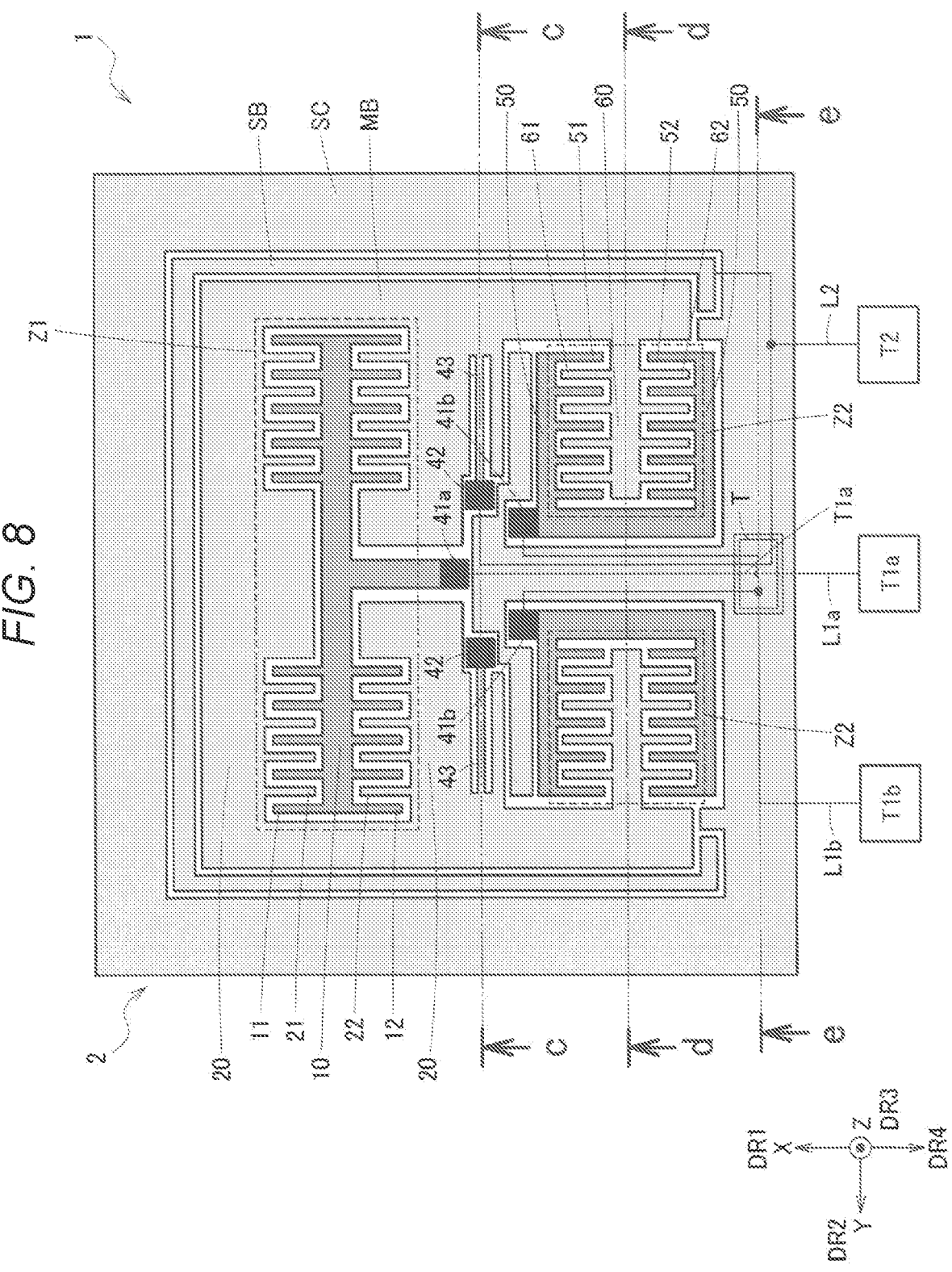
FIG. 8 is a plan view of a first detailed example of the embodiment.

FIG. 8 is a plan view of a first detailed example of the embodiment. The first detailed example basically has the same configuration as the configuration example shown in FIG. 1, but is different in the configuration of the probe electrodes. Specifically, fixed electrodes 12 are provided in the fixed electrode portion 10 and movable electrodes 22 are provided in the movable electrode portion 20, fixed electrodes 52 are provided in the fixed electrode portions 50 and movable electrodes 62 are provided in the movable electrode portions 60. The fixed electrode fixing portions 41a, 41b are aggregated inside of the movable body MB like those in the configuration example shown in FIG. 1, and the respective wires are provided on the wiring structure SA provided in the opening part OP. Note that, hereinafter, the fixed electrodes 11, 12 are collectively referred to as "fixed electrodes 14", the movable electrodes 21, 22 are collectively referred to as "movable electrodes 24", the fixed electrodes 51, 52 are collectively referred to as "fixed electrodes 54", and the movable electrodes 61, 62 are collectively referred to as "movable electrodes 64".

As described above, when an out-of-plane rotation Z-axis physical quantity sensor is used as the sensor of the MEMS device 1, the opening part OP is provided at the side with the smaller rotation torque of the movable body MB with respect to the rotation axis, and thereby, the rotation torque may be made smaller. Accordingly, the rotation torque of the whole movable body MB may be increased and higher sensitivity and downsizing can be realized. Further, the wiring structure SA provided under the routing portions of the respective wires is set at e.g., the ground and degradation of capacitance offset due to provision of an unnecessary capacitance between the probe electrodes may be suppressed.

FIG. 9 is a schematic diagram of section structures of the first detailed example along dashed-dotted lines c, d in FIG. 8. The upper part of FIG. 9 corresponds to the section along the dashed-dotted line c and shows the sectional shape cut along the fixing portions 42 and the supporting beams 43. In the sectional view along the dashed-dotted line c, the first wire L1a and the second wire L2 are provided on the wiring structure SA via the insulating film D. The second wire L2 extends in the opposite direction to the second direction DR2 along the dashed-dotted line c and is electrically coupled to the movable body MB and the movable electrode portions 20, 60 via the supporting beams 43. Further, the first wire L1a is linearly provided from the fixed electrode fixing portion 41a to the fixed electrode terminal T1a along the first direction DR1. The lower part of FIG. 9 corresponds to the section along the dashed-dotted line d. As shown in FIG. 8, the respective wires are linearly provided along the wiring structure SA and extend. In the sectional view along the dashed-dotted line d, the first wires L1b, L1a, the second wire L2, and the first wire L1b are sequentially placed from the side in the second direction DR 2.

Figure 10:
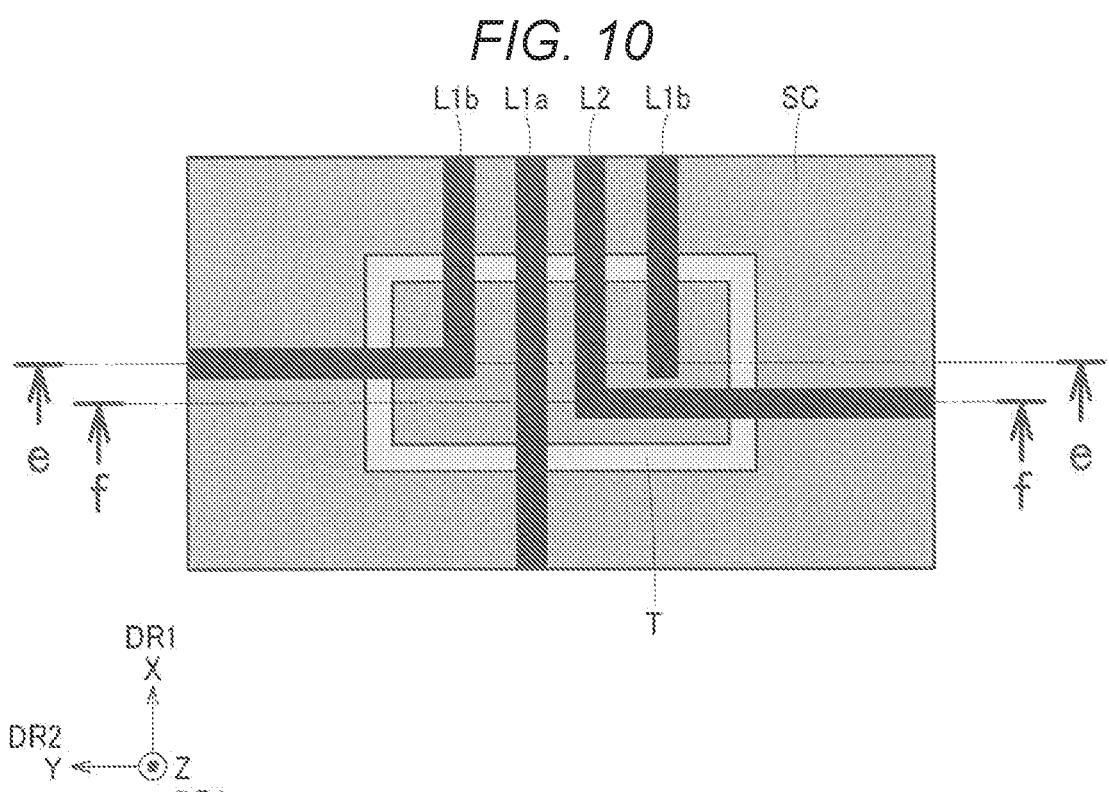
FIG. 10 is a diagram for explanation of an intersection portion of wires in the embodiment.
Figure 10:
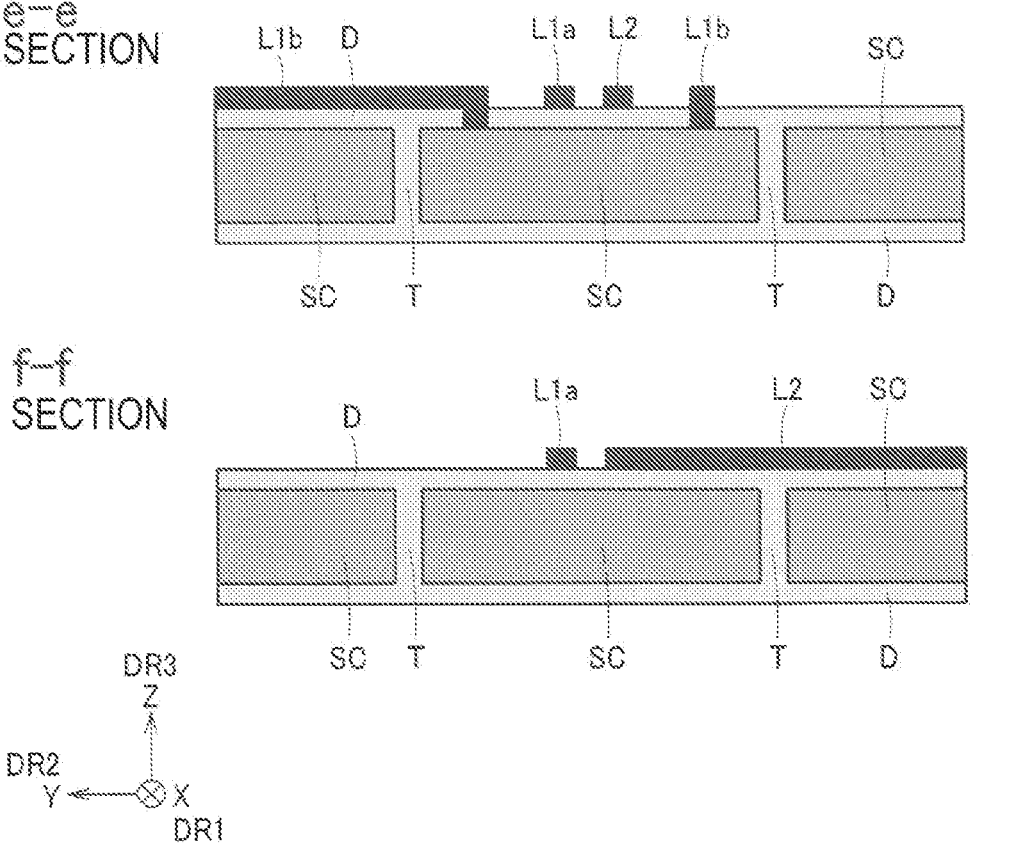

FIG. 10 is a diagram for explanation of an intersection portion of the respective wires in the embodiment shown in FIG. 1 etc. As shown in the upper part of FIG. 10, in the first detailed example, the wires including the first wires L1a, L1b and the second wire L2 are provided and the number of wires is four in total. Of these wires, the two first wires L1b are provided on the right end and the left end of the wiring structure SA or the shield structure SC in the plan view. Therefore, it is necessary to couple the two first wires L1b across the first wire L1a and the second wire L2 placed at the center of the wiring structure SA or the like. Here, in the embodiment, as shown in FIG. 10, a trench T is provided and the first wires L1*b* are coupled via the shield structure SC. As shown in the upper part of FIG. 10, the trench structure has a rectangular shape in the plan view. As shown in the lower parts of FIG. 10 in sectional views along dashed-dotted lines e, f, the insulating film D is opened immediately beneath only the two first wires L1*b* to be coupled and the wires are electrically coupled to the shield structure SC. Further, the two first wires L1*b* are electrically coupled via the shield structure SC. The shield structure SC is electrically insulated from another portion of the shield structure SC by the groove of the trench T. In the sectional shape along the dashed-dotted line f shown in the lower part of FIG. 10, sectional shapes of the second wire L2 and the lower layers thereof are shown. The second wire does not intersect with the other wire and the insulating film D is not opened therefor.

As described above, when the first wire L1 or the second wire L2 is divided into two and placed on the left and right with e.g., the opening part OP in between, the trench T is provided in the shield structure SC or the wiring structure SA, and thereby, the two wires may be coupled via the structure layer. When the configuration A described in the above described FIG. 5 is employed, the respective wires are not provided on the wiring structure SA via the insulating film D, but the structure itself is used as the respective wires. Accordingly, it is difficult to intersect or electrically couple the respective wires in the same layer as that of the wiring structure, and it is necessary to intersect or couple the wires via the upper layer or the lower layer of the structure layer. The technique of routing the respective wires in the structure layer is particularly useful in the MEMS device using the SOI substrate.

Figure 11:
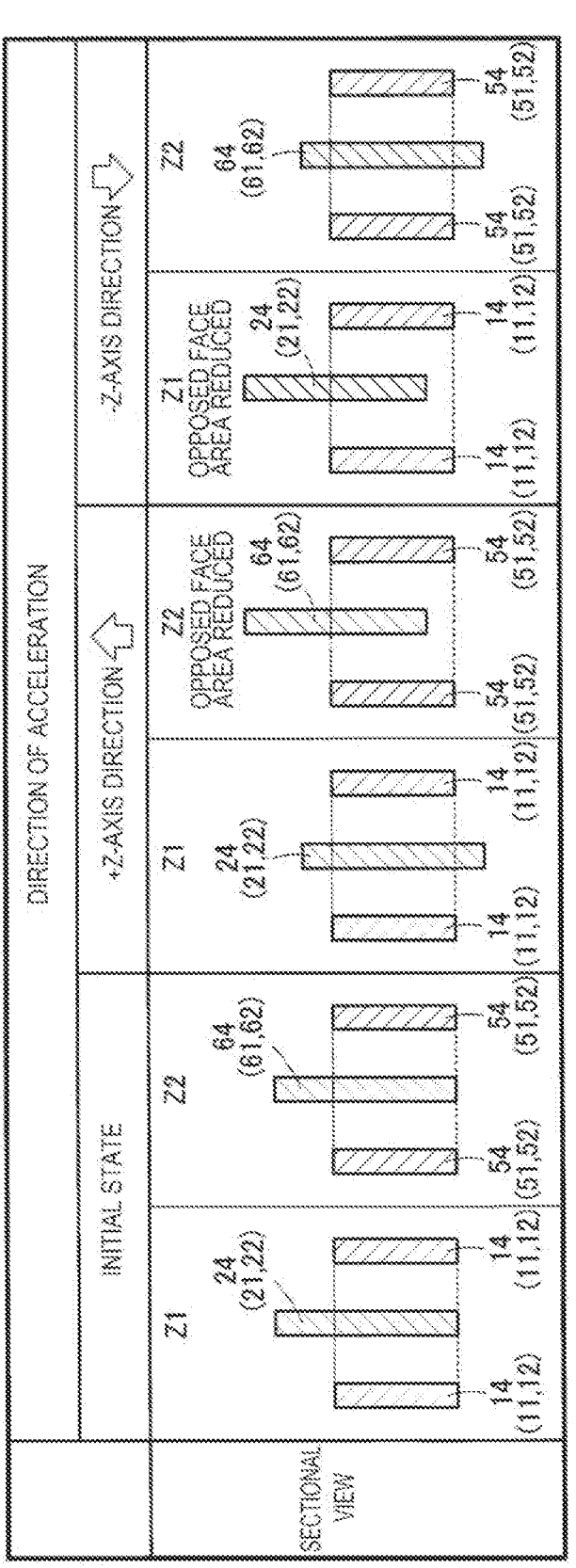
FIG. 11 is a diagram for explanation of shapes and motions of probe electrodes of the first detailed example.

FIG. 11 is a diagram for explanation of shapes and motions of the probe electrodes of the first detailed example shown in FIG. 8. The motion of the first detailed example has the same motion principle as that described in FIG. 2. The movable electrodes 24, 64 are displaced according to the acceleration in the third direction DR3 and a physical quantity such as an acceleration may be detected. FIG. 11 shows thickness patterns in the third direction DR3 of the probe electrodes of the MEMS device 1 of the first detailed example as seen from the side in the fourth direction DR4. In the detection part Z1, the thickness of the movable electrode 24 in the third direction DR3 is larger than the thickness of the fixed electrode 14 in the third direction DR3. Also, in the detection part Z2, the thickness of the movable electrode 64 in the third direction DR3 is larger than the thickness of the fixed electrode 54 in the third direction DR3.

Figure 12:
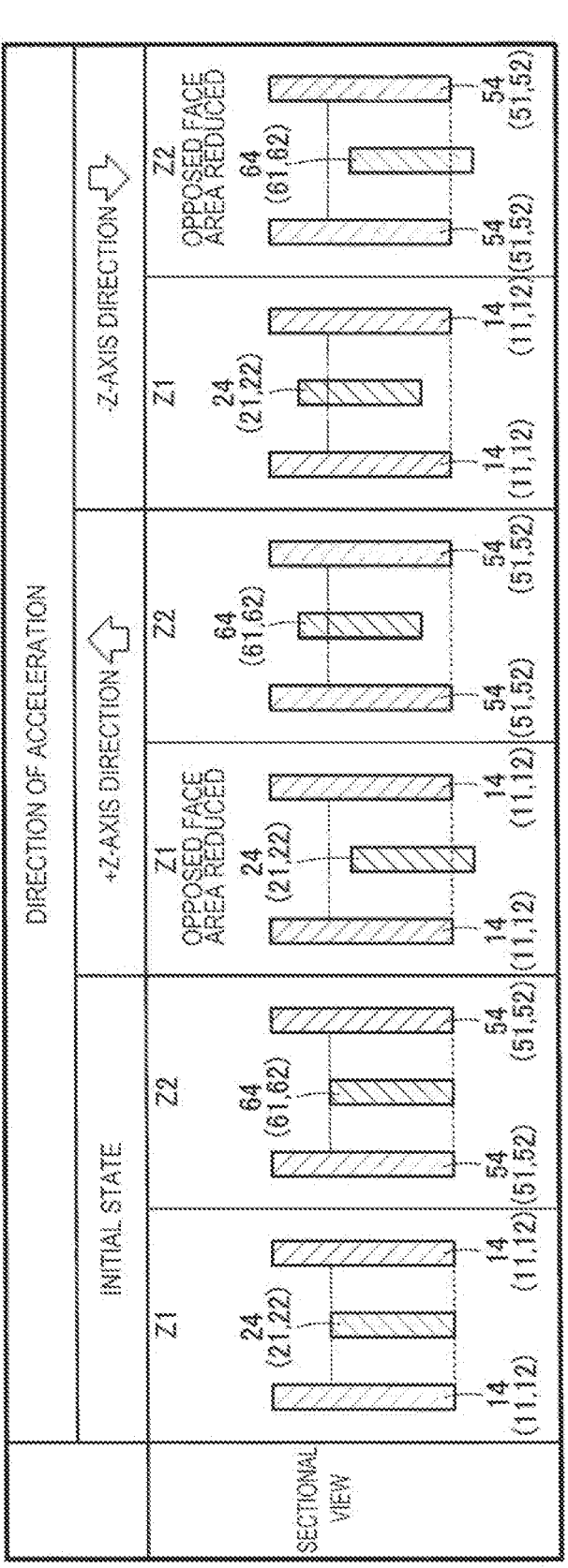
FIG. 12 is another configuration example of the probe electrodes in the first detailed example.

FIG. 12 shows an example when the thickness patterns of the probe electrodes of the MEMS device 1 shown in FIGS. 1 and 8 are changed. In the thickness patterns of the probe electrodes shown in FIG. 12, the thickness of the fixed electrode 14 in the third direction DR3 is larger than the thickness of the movable electrode 24 in the third direction DR3. Further, the thickness of the fixed electrode 54 in the third direction DR3 is larger than the thickness of the movable electrode 64 in the third direction DR3. In this case, the detection part in which the opposed face area of the probe electrodes is reduced with respect to the direction of the acceleration is opposite to that in the case of the first detailed example. That is, when an acceleration is generated in the +Z-axis direction, the opposed face area of the probe electrodes is reduced in the probe electrodes at the detection part Z1 side. Or, when an acceleration is generated in the −Z-axis direction, the opposed face area of the probe electrodes is reduced in the probe electrodes at the detection part Z2 side.

Figure 13:
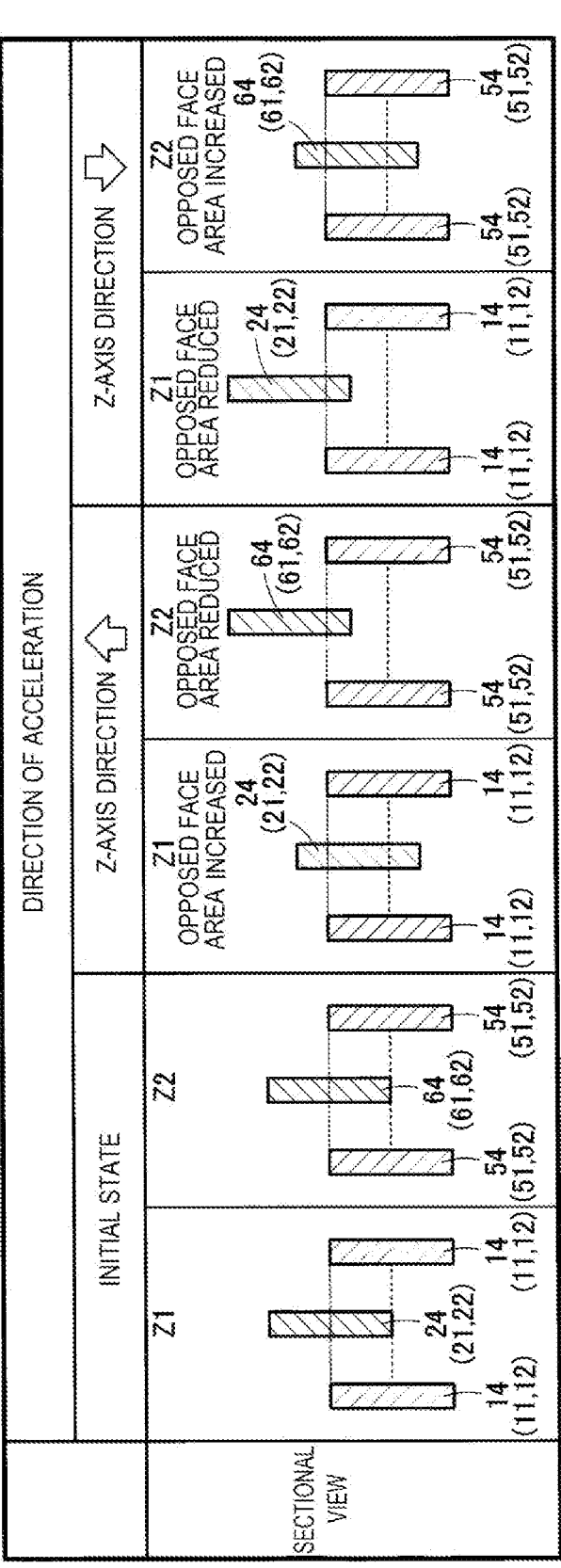
FIG. 13 is another configuration example of the probe electrodes in the first detailed example.
Figure 14:
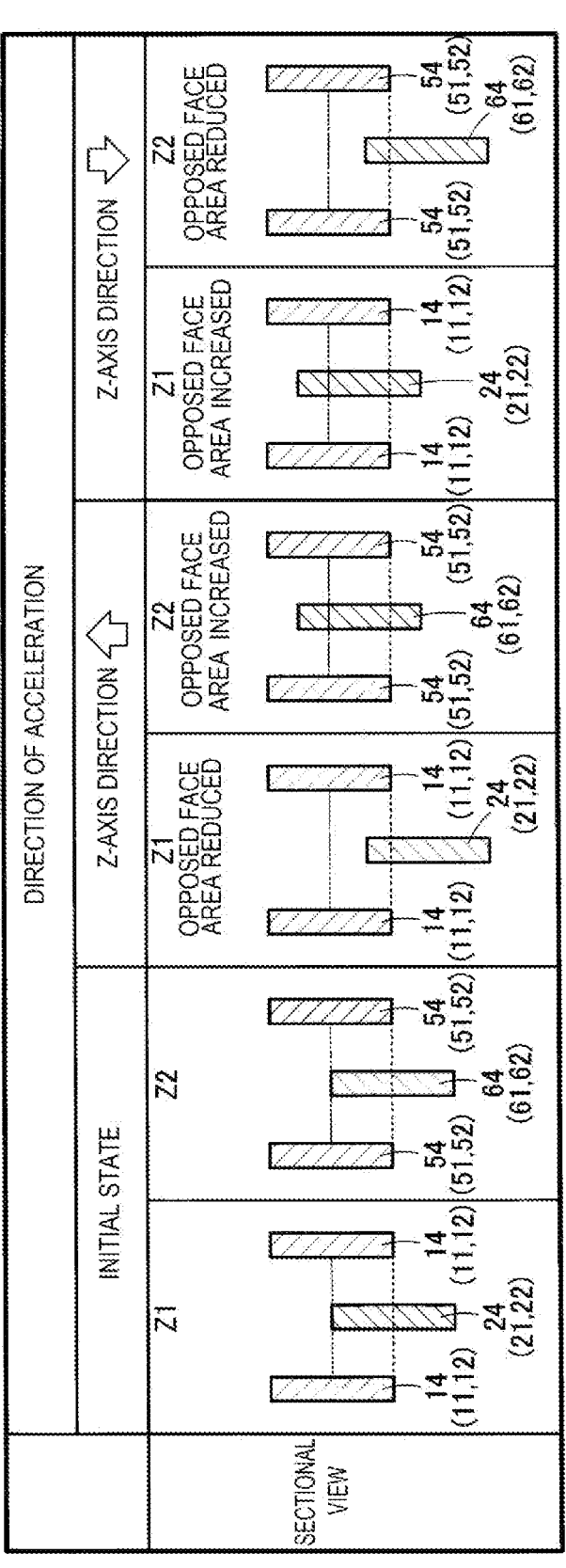
FIG. 14 is another configuration example of the probe electrodes in the first detailed example.

FIG. 13 shows another example when the thickness patterns of the probe electrodes of the MEMS device 1 shown in FIGS. 1 and 8 are changed. As shown in FIG. 13, for the thicknesses of the probe electrodes in the third direction DR3, a two-side offset shape with offsets provided at both sides of the side in the +Z direction and the side in the −Z direction side may be employed. In this case, as shown in the center and the right parts of FIG. 13, the opposed face area of probe electrodes not only decreases but also increases in both of the detection parts Z1, Z2 regardless of the direction of the acceleration in the third direction DR3. Further, the two-side offset shape of the probe electrodes shown in FIG. 13 may be formed such that the concavity and the convexity are exchanged and the movable electrodes 24, 64 are placed at the −Z side as shown in FIG. 14. As shown in FIGS. 13, 14, the two-side offset shape is employed as the thickness pattern of the probe electrodes, and thereby, compared to the case where the probe electrodes having the one-side offset shape as shown in FIGS. 11 and 12 are employed, the detection sensitivity of the physical quantity may be increased twofold.

Figure 15:
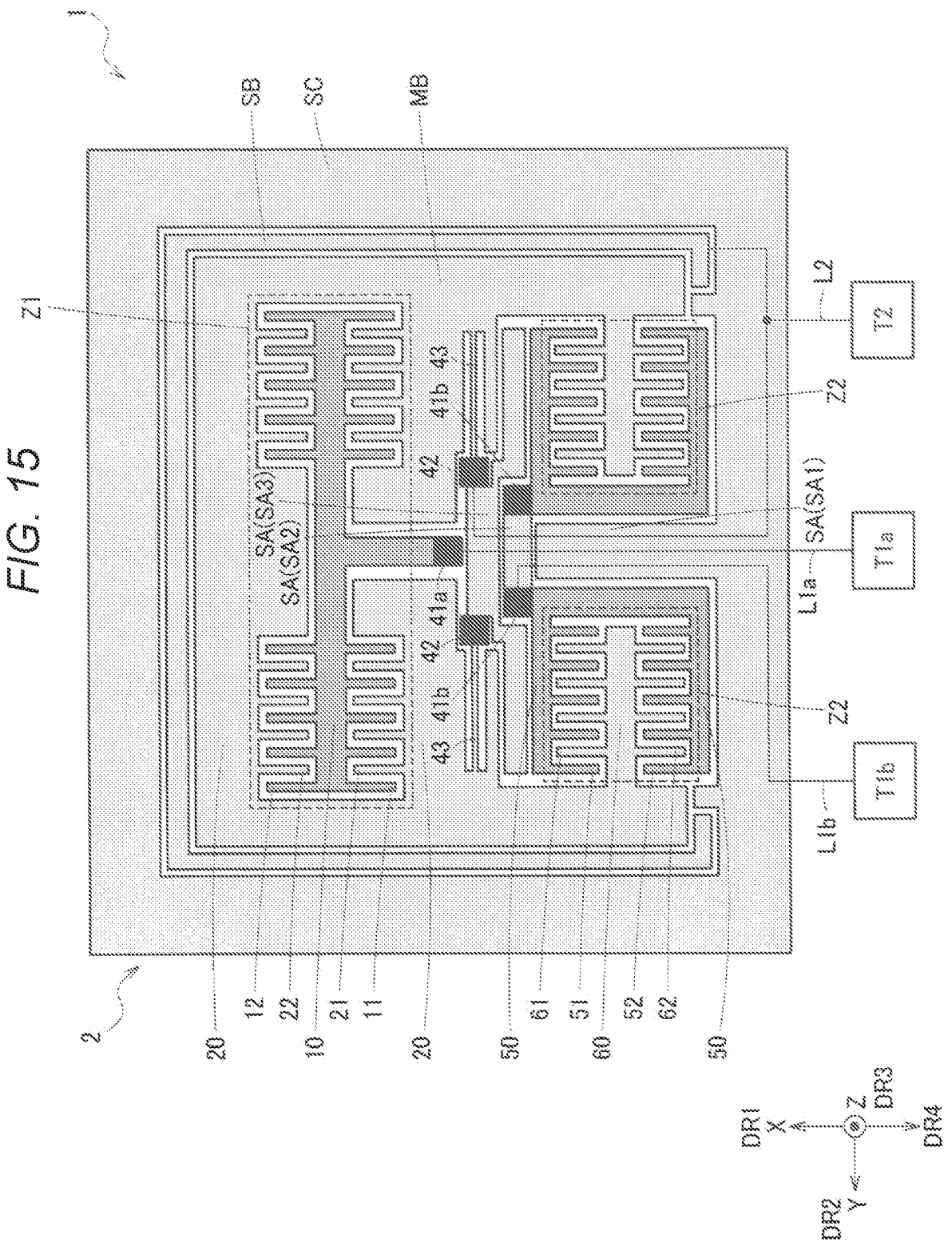
FIG. 15 is a plan view of a second detailed example of the embodiment.

FIG. 15 is a plan view of a second detailed example of the embodiment. A difference from the MEMS device 1 shown in FIG. 1 is that the wiring structure SA is divided into three configuration parts. Specifically, as shown in FIG. 15, in the second detailed example, the wiring structure SA is divisionally provided in the order of the configuration part SA3, the configuration part SA2, and the configuration part SA1 from the side in the first direction DR1 in the plan view. The configuration part SA1 is a main part of the wiring structure SA occupying a larger part of the opening part OP and may be set at e.g., the ground like that in the configuration example described in FIG. 1. The configuration part SA2 couples the respective fixed electrode portions 50 in the detection part Z2, and the respective fixed electrode portions 50 in the detection part Z2 are electrically continuous by the configuration part SA2. Therefore, for example, the configuration part SA2 is at the same potential as that of the fixed electrode portions 50 in the detection part Z2. The configuration part SA3 couples the fixing portions 42, the respective fixing portions 42 are electrically continuous by the configuration part SA3 and, for example, the potential of the configuration part SA3 is the same potential as that of the movable body MB. Further, in the second detailed example, only one first wire L1*b* is provided and the electrical contact with the two fixed electrode portions 50 may be made by the first wire L1*b*. Specifically, the respective fixed electrode portions 50 in the detection part Z2 are coupled by the configuration part SA2 of the wiring structure SA and the contact with the two fixed electrode portions 50 may be made by coupling of one fixed electrode portion 50 of the respective fixed electrode portions 50 to the first wire L1*b*. As described above, the second detailed example is the same as the configuration example shown in FIG. 1 in the basic structure, however, different in that the potentials of the wiring structure SA under the respective wires inside of the MEMS device 1 are the ground and the same potential as the potential of the movable body MB or the potential of the fixed electrode portions 50 in the detection part Z2.

As described above, according to the second detailed example, the wiring structure layer within the opening part OP is fixed at two or more different potentials. The configuration part SA2 coupling the fixed electrode fixing portions 41*b* is provided, and thereby, the number of first wires L1*b* may be reduced to one and the number of intersections of the wires may be reduced. There is an advantage that the MEMS device 1 may be downsized by simplification of wiring. On the other hand, the wiring structure SA originally at the ground potential is insulatively separated into the respective configuration parts SA1, SA2, SA3 at different potentials, and parasitic capacitances are generated. For example, in the configuration part SA3 set at the same potential as that of the movable body MB, electric charge corresponding to the parasitic capacitance is generated due to the potential difference from the adjacent fixed electrode portions 50 in the detection part Z2. For example, electric charge corresponding to the parasitic capacitances is respectively generated between the configuration part SA3 at the same potential as that of the movable body MB and the configuration part SA2 at the same potential as that of the fixed electrode portions 50 in the detection part Z2 and between the configuration part SA3 at the same potential as that of the movable body MB and the fixed electrode fixing portions 41b in the detection part Z2. In view of differential, when the capacitance offsets by the parasitic capacitances generated between the structure SBC and the respective detection parts are larger, adjustments may be made by increase of the opposed face area in the location where the opposed face area between the respective structures is smaller, e.g., the configuration part SA3 at the same potential as that of the movable body MB and the fixed electrode fixing portion 41a and reduction of the distance therebetween. Thereby, when it is difficult to cancel out the offsets of the capacitances, the capacitive coupling CLL between the respective wires is adjusted by changing of the gap between the wires and the length of the opposed faces, and thereby, the capacitance offsets may be improved.

As supplementation for the second detailed example, the wiring structure provided in the opening part OP is set at two or more different potentials. In this manner, the number of intersections of the respective wires may be reduced and the wiring efficiency may be increased. Accordingly, the higher sensitivity and downsizing of the MEMS device 1 may be realized. Here, unnecessary capacitances are generated between the movable electrodes 61, 62 and the fixed electrodes 51, 52 and capacitance offsets are generated, however, the capacitance offsets may be suppressed by adjustment of the distance between the respective structures, the distance between the respective wires, and the length of the opposed faces.

Figure 16:
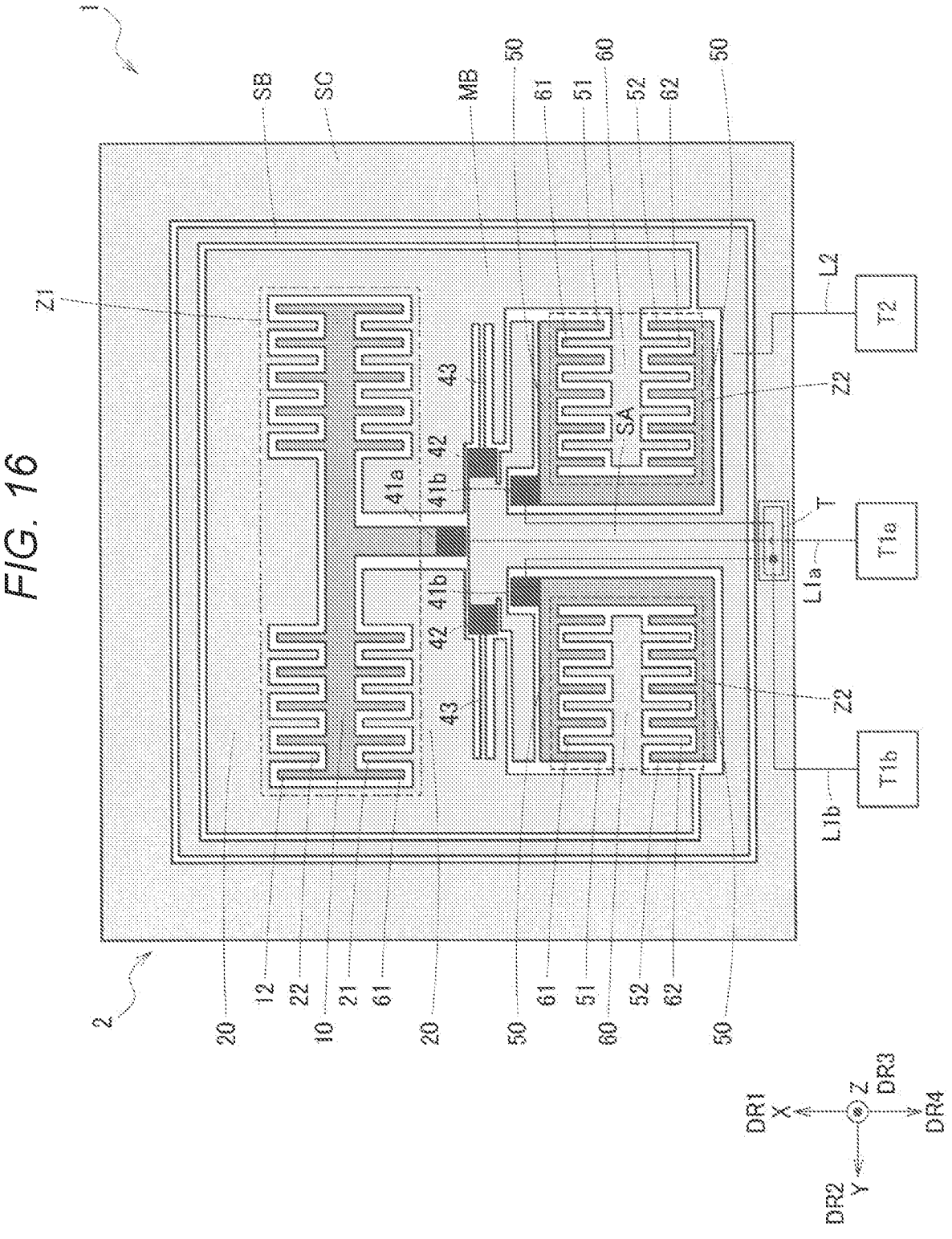
FIG. 16 is a plan view of a third detailed example of the embodiment.

FIG. 16 is a plan view of a third detailed example of the embodiment. The basic structure of the third detailed example is similar to that of the first detailed example, but the wiring structure SA is integrated with the stopper structure SB and the stopper structure SB and the wiring structure SA are set at the same potential as that of the movable body MB. Further, in the third detailed example, the second wire L2 contacting the movable body MB is not provided on the wiring structure SA and the movable body MB is routed from the fixing portions 42 as the anchors of the movable body MB to the vicinity of the movable electrode terminal T2 on the lower right in FIG. 16 via the wiring structure SA and the stopper structure SB. Further, the contact with the second wire L2 may be made by the stopper structure SB located in the position near the movable electrode terminal T2. Accordingly, in the third detailed example, the wire length of the second wire L2 is shorter than those of the first detailed example and the second detailed example.

That is, the MEMS device of the embodiment includes the stopper structure SB and the shield structure SC. The stopper structure SB is provided to surround the movable body MB and serves as a stopper for the movable body MB. The shield structure SC is provided to surround the stopper structure SB. The wiring structure SA is integrally formed with the stopper structure SB or the shield structure SC.

According to the configuration, the device may be downsized by simplification of the second wire L2 making contact with the movable body MB. Here, the wiring structure SA originally set at the ground potential is insulatively separated and set at the movable body potential, and parasitic capacitances are generated between the wiring structure SA and the fixed electrode portions 50 and fixed electrode fixing portions 41b. In view of differential, when the parasitic capacitances are larger, the offsets by the parasitic capacitances may be suppressed by increase of the opposed face area in the location where the opposed face area between the structures is smaller and reduction of the distance therebetween. As the location where the opposed face area between the structures is smaller, for example, the location between the wiring structure SA and the stopper structure SB at the same potential as that of the movable body MB and the fixed electrode fixing portion 41a as the anchors in the detection part Z1. Or, the distance between the wiring structure SA and the stopper structure SB at the same potential as that of the movable body MB and the structures in the supporting portion of the probe electrodes in the detection part Z2 may be increased. Or, the capacitance offsets may be adjusted by setting of the first wire L1b as the wire in the detection part Z2 and the second wire L2 as the wire of the movable electrode to be adjacent on the shield structure SC and parallelizing of the wires along a long distance. As another technique of cancelling out the capacitance offsets, the capacitance offsets may be improved by adjustment of the capacitive couplings CLL between the respective wires. For example, the gap between the wires and the length of the opposed faces between the first wire L1 and the second wire L2 may be changed. Further, for example, when the wiring structure SA and the shield structure SC are integrally formed as those in the first detailed example, as described above, the potential of the wiring structure SA may be constantly fixed to the ground potential and the respective wires provided in the upper layer of the wiring structure SA are electrically stabilized, and thereby, the high-accuracy physical quantity detection can be performed.

Here, in comparison between the first detailed example shown in FIG. 8 and the second detailed example, in the first detailed example, the wiring structure SA is not divided and coupled to the shield structure SC. The configuration is employed, and thereby, the wiring structure SA is set at a predetermined potential such as the ground and an effect of suppressing noise components by the capacitive couplings CLL, CLZ shown in FIGS. 5 and 6 is greater. On the other hand, regarding the routing of the respective wires, it is necessary to provide e.g., a trench T as shown in FIG. 8 etc. because the wiring structure SA is not divided.

In the second detailed example shown in FIG. 15, the wiring structure SA is divided into the configuration parts SA1, SA2, SA3 and the wires may be routed by direct contact with one of the configuration parts SA1, SA2, SA3 without provision of the trench T as in the first detailed example and the routing of the wires may be simplified. Further, in the third detailed example shown in FIG. 16, the wiring structure SA is coupled to the movable body MB via the fixing portions 42 or the like, and thereby, the contact between the movable electrode terminal T2 and the movable body MB may be easily made and the routing of the wires may be simplified.

As supplementation for the second detailed example and the third detailed example, part of the structure layer is provided to be adjacent to the movable electrode portions 20, 60 and the fixed electrode portions 10, 50, and thereby, parasitic capacitances between the structure SBC and the respective detection parts are generated. Here, when it is difficult to cancel out the offsets of the capacitance CZ1 in the detection part Z1 and the capacitance CZ2 in the detection part Z2, the capacitive coupling CLL between the respective wires may be adjusted by changing of the distance between the respective wires and the length of the opposed faces.

As supplementation for the third detailed example, the wiring structure SA occupying the whole opening part OP is fixed at the same potential as that of the movable body MB. Thereby, the number of intersections of the respective wires and the routing lengths may be reduced, and the wiring efficiency is increased and the higher sensitivity and downsizing of the MEMS device 1 may be realized. Here, unnecessary capacitances are generated between the movable electrodes 61, 62 and the fixed electrodes 51, 52 and capacitance offsets are generated, however, the capacitance offsets may be suppressed by adjustment of the distance between the respective structures, the distance between the respective wires, and the length of the opposed faces.

That is, the MEMS device 1 of the embodiment includes the stopper structure SB provided to surround the movable body MB, set at the same potential as that of the movable body MB, and serving as a stopper for the movable body MB. The wiring structure SA is integrally formed with the stopper structure SB.

According to the configuration, an unnecessary electrostatic force is not generated between the stopper structure SB and the movable body MB and high-accuracy detection can be performed. Further, the stopper structure SB is provided integrally with the wiring structure SA, and thereby, the number of intersections of the respective wires and the routing lengths may be reduced, and the wiring efficiency is increased and the higher sensitivity and downsizing of the device may be realized. In the embodiment, capacitance offsets with unnecessary capacitances between the movable electrodes 24 and the fixed electrodes 14 or the movable electrodes 64 and the fixed electrodes 54 are generated, however, the capacitance offsets in the detection part Z1 and the detection part Z2 may be suppressed by adjustment of the gaps between the respective structures and the respective wires and the length of the opposed faces.

Figure 17:
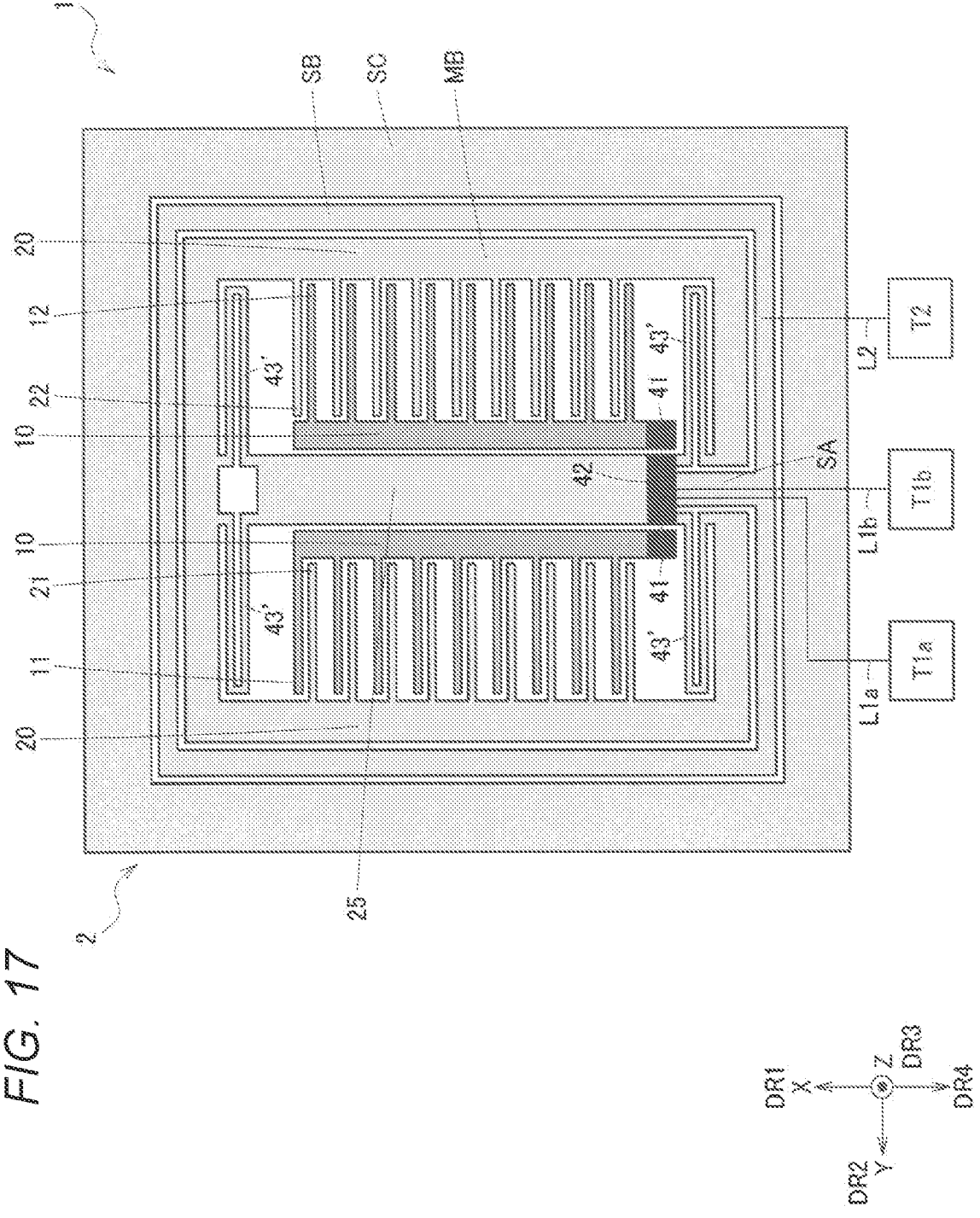
FIG. 17 is a plan view of a fourth detailed example of the embodiment.

FIG. 17 is a plan view of a fourth detailed example of the embodiment. The fourth detailed example is a configuration example different from the first to third detailed examples in that an X-axis acceleration sensor is provided in the structure SBC including the stopper structure SB and the shield structure SC. In the fourth detailed example, in the structure layer, supporting springs 43' as springs are provided from one side of the fixing portion 42 fixing the movable electrode portions 20 and supporting springs 43' are provided from an end of an immovable movable electrode bar 25 at the other side and respectively coupled to the movable body MB. The supporting springs 43' are provided in four corners for suppression of motions in unnecessary modes for a desired motion mode. The fixed electrodes 11, 12 having different polarities are respectively provided in the fixed electrode portions 10 provided on the left and right of the movable electrode bar 25, the movable electrodes 21 and the fixed electrodes 11 are placed to form pairs, and the movable electrodes 22 and the fixed electrodes 12 are placed to form pairs. Here, the fixing portions 42 of the movable electrode portions 20 and the fixed electrode fixing portions 41 of the fixed electrode portions 10 respectively have cantilevered structures supported at single points and the fixed electrode fixing portions 41 are respectively adjacently provided on both sides of the fixing portion 42. Capacitances are generated between the probe electrodes and changes thereof may be detected according to an acceleration or the like. The stopper structure SB is provided around the movable body MB in the same structure layer to be adjacent to the four sides of the movable body MB, and the shield structure SC is provided around the structure. For example, the stopper structure SB is set at the same potential as that of the movable body MB and the shield structure SC is set at the ground.

That is, the MEMS device of the embodiment includes the fixing portion 42 electrically coupled to the movable body MB and the movable electrode terminal T2. The fixing portion 42 is electrically coupled to the wiring structure SA. The movable electrode terminal T2 is electrically coupled to the fixing portion 42 via the wiring structure SA and the stopper structure SB.

According to the configuration, the movable body MB, the fixing portion 42, and the wiring structure SA are electrically coupled and contact with the movable electrodes 21, 22, 61, 62 may be made from the wiring structure SA. The movable electrode terminal T2 is provided, and thereby, voltage control of the movable electrodes 21, 22, 61, 62 can be performed from the terminal.

Figure 18:
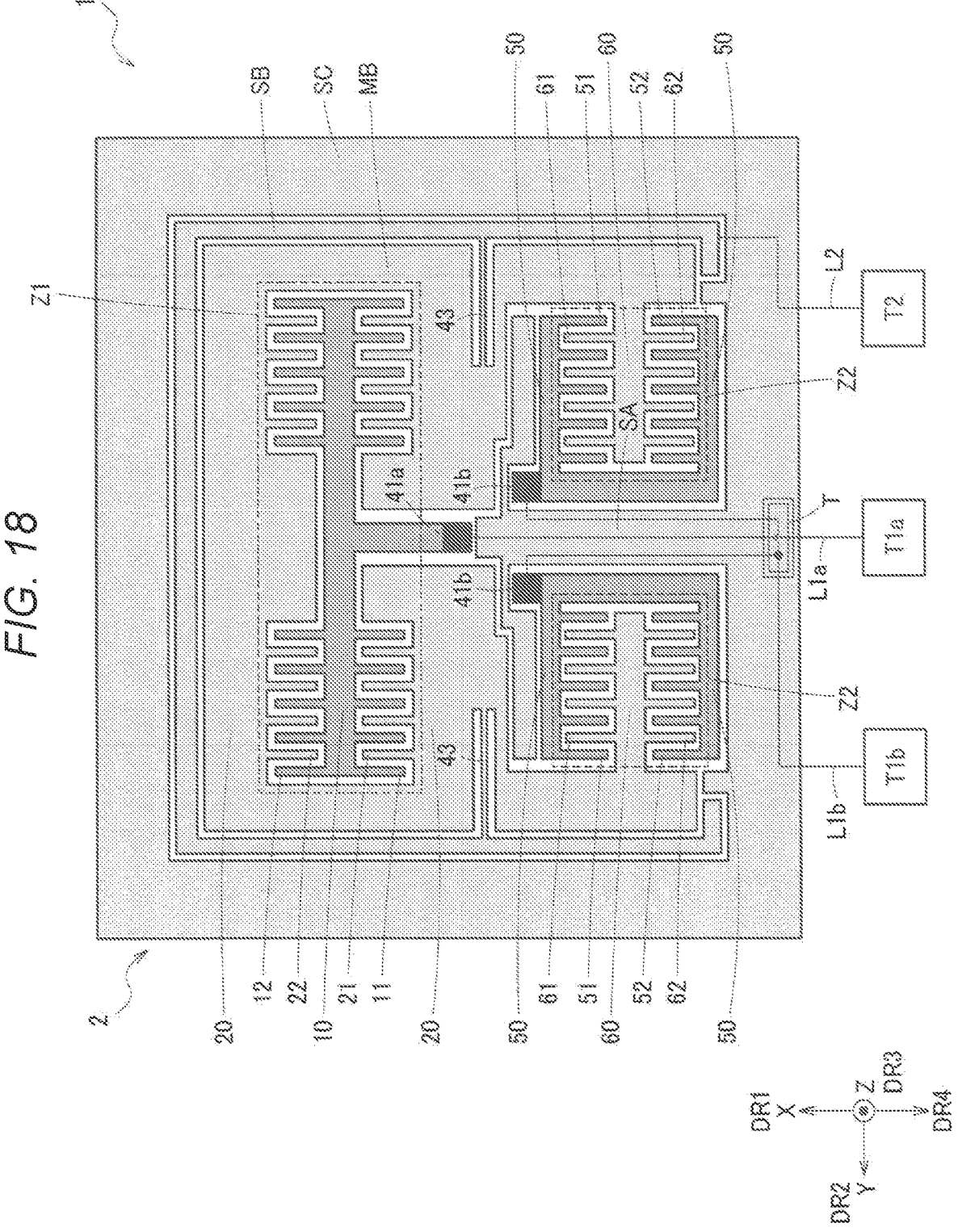
FIG. 18 is a plan view of a fifth detailed example of the embodiment.

FIG. 18 is a plan view of a fifth detailed example of the embodiment. The fifth detailed example is a configuration example in which a Z-axis acceleration sensor is applied to the MEMS device 1 and has the same basic structure as that of the MEMS device 1 shown in the first detailed example etc. Differences from the MEMS device 1 shown in the first detailed example etc. are that the movable electrode portions 20 are fixed by the stopper structure SB provided around the movable body MB and the fixing portions 42 of the movable electrode portions 20 in the first detailed example etc. are not provided. Note that, in the fifth detailed example, the stopper structure SB may be set at the same potential as that of e.g., the movable body MB.

That is, the MEMS device of the embodiment includes the supporting beams 43 and the stopper structure SB. One ends of the supporting beams 43 are coupled to the movable body MB. The stopper structure SB is coupled to the other ends of the supporting beams 43, provided to surround the movable body MB, and serves as a stopper for the movable body MB.

According to the configuration, the movable body MB may be coupled to the substrate 2 by the stopper structure SB without provision of the fixing portions 42 fixing the movable body MB. Accordingly, it is not necessary to separately provide the fixing portions 42 and downsizing of the MEMS device 1 can be realized. Further, the movable body MB is electrically coupled to the stopper structure SB, and thereby, contact may be made from any point around the movable body MB and the degree of freedom of wiring design may be increased.

Further, the MEMS device 1 of the embodiment includes the movable electrode terminal T2 electrically coupled to the stopper structure SB.

According to the configuration, the routing of the respective wires including the first wire L1 and the second wire L2 is further simplified, the wiring efficiency is increased, and the MEMS device 1 may be downsized.

Figure 19:
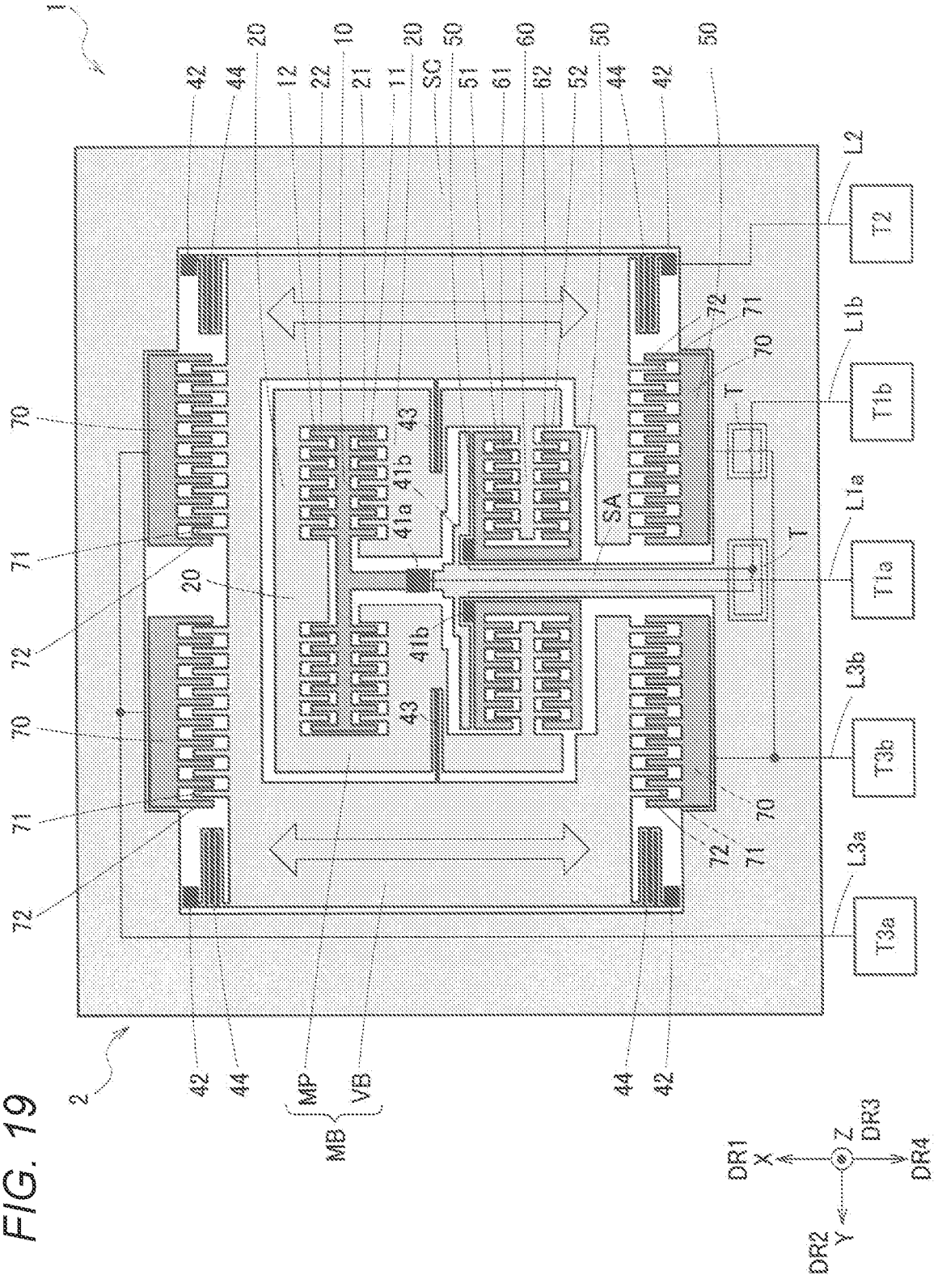
FIG. 19 is a plan view of a sixth detailed example of the embodiment.

FIG. 19 is a plan view of a sixth detailed example of the embodiment. The sixth detailed example has the same basic structure as that of configuration example shown in FIG. 1 etc., but is different in that the stopper structure SB is not provided and a gyro sensor is provided inside of the shield structure SC.

In the sixth detailed example, an electrical signal having the same frequency as the resonance frequency of the movable body MB is input by an oscillation circuit (not shown) and the movable body MB vibrates within an XY-plane. In the sixth detailed example, a configuration part having the movable electrodes 21, 22, 61, 62 and making a see-saw motion by twisting of the supporting beams 43 is referred to as "movable part MP". Further, the movable part MP and a vibrator VB provided around the part are collectively referred to as "movable body MB". The vibrator VB is coupled to the substrate 2 by supporting springs 44 of the fixing portions 42 provided in four corners and coupled to the movable part MP provided inside of the vibrator VB by the supporting beams 43 inside of the shield structure SC. The movable body MB including the movable part MP and the vibrator VB is driven by drive electrodes 71, 72 in in-plane directions shown by arrows in FIG. 19. Voltages may be applied to the drive electrodes 72 from terminals T3a, T3b via third wires L3a, L3b, and the vibrator VB and the movable part MP coupled to the vibrator VB may vibrate in the directions of the arrows shown in FIG. 19 by electrostatic forces due to voltage differences between the voltages applied to the terminals T3a, T3b and the voltage applied to the movable electrode terminal T2. Accordingly, in FIG. 19, when torque around a rotation axis in a direction along an axis within the XY-plane orthogonal to the vibration directions of the movable body MB shown by the arrows, e.g., the Y-axis is generated, a Coriolis force is generated in a direction along the Z-axis obtained by a cross product of vectors of the vibration velocity and the angular velocity of the vibrator. The movable part MP may make a see-saw motion around the supporting beams 43 as the rotation axis based on the Coriolis force and detect the changes of the opposed face areas of the probe electrodes varying by the see-saw motion as changes of capacitances.

In the sixth detailed example, the stopper structure SB is not provided, but the placement pattern of the wiring structure SA and the shield structure SC is the same as the configuration example shown in FIG. 1 and the first detailed example. Accordingly, the wiring efficiency may be increased. Further, the potential of the wiring structure SA is set to a predetermined potential, and thereby, the respective wires may be electrically stabilized and the detection accuracy of the physical quantity may be increased.

As an application example of the embodiment, the case where the gyro sensor is provided inside of the shield structure SC is explained, however, the effects of the embodiment may be obtained using an actuator or the like other than the gyro sensor.

3. Inertial Measurement Unit

Figure 20:
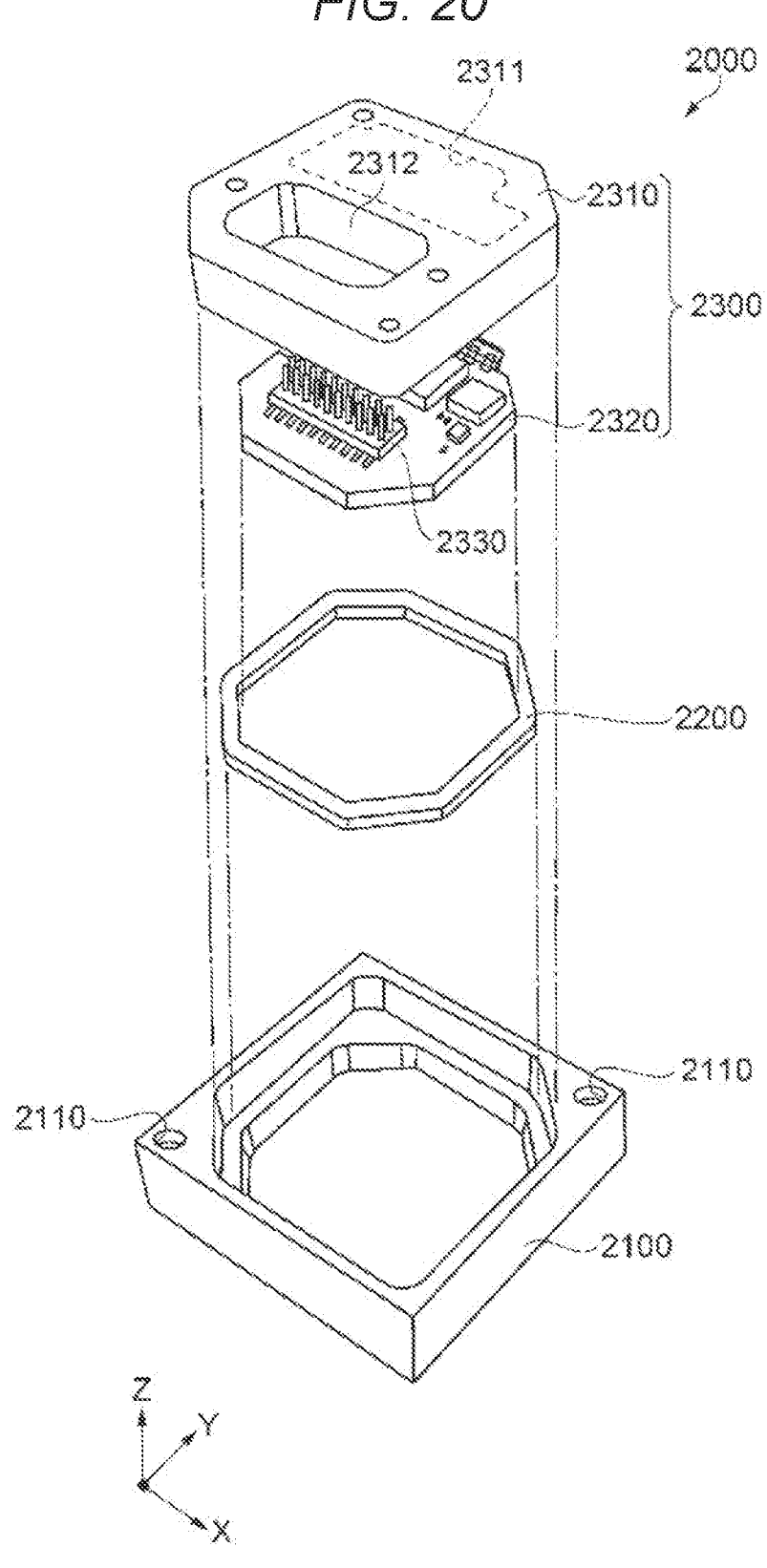
FIG. 20 is an exploded perspective view showing a schematic configuration of an inertial measurement unit having a physical quantity sensor.

Next, an example of an inertial measurement unit 2000 of the embodiment will be explained using FIGS. 20 and 21. The inertial measurement unit 2000 (IMU) shown in FIG. 20 is a unit detecting an inertial motion quantity such as an attitude, a behavior, or the like of a moving body such as an automobile or a robot. The inertial measurement unit 2000 is the so-called six-axis motion sensor including acceleration sensors detecting accelerations ax, ay, az in directions along the three axes and angular velocity sensors detecting angular velocities ωx, ωy, ωz around the three axes.

The inertial measurement unit 2000 is a rectangular parallelepiped having a nearly square planar shape. Screw holes 2110 as mounting portions are formed near two vertexes located in a diagonal direction of the square. Two screws are inserted through the two screw holes 2110, and thereby, the inertial measurement unit 2000 may be fixed to a mounted surface of a mounted body of an automobile or the like. Note that the unit can be downsized to a size that can be mounted on e.g., a smartphone or a digital camera by selection of components and design changes.

The inertial measurement unit 2000 has a configuration including an outer case 2100, a joint member 2200, and a sensor module 2300, in which the sensor module 2300 is inserted into the outer case 2100 via the joint member 2200. The sensor module 2300 has an inner case 2310 and a circuit board 2320. In the inner case 2310, a recessed portion 2311 for preventing contact with the circuit board 2320 and an opening 2312 for exposing a connector 2330, which will be described later, are formed. The circuit board 2320 is joined to the lower surface of the inner case 2310 via an adhesive.

Figure 21:
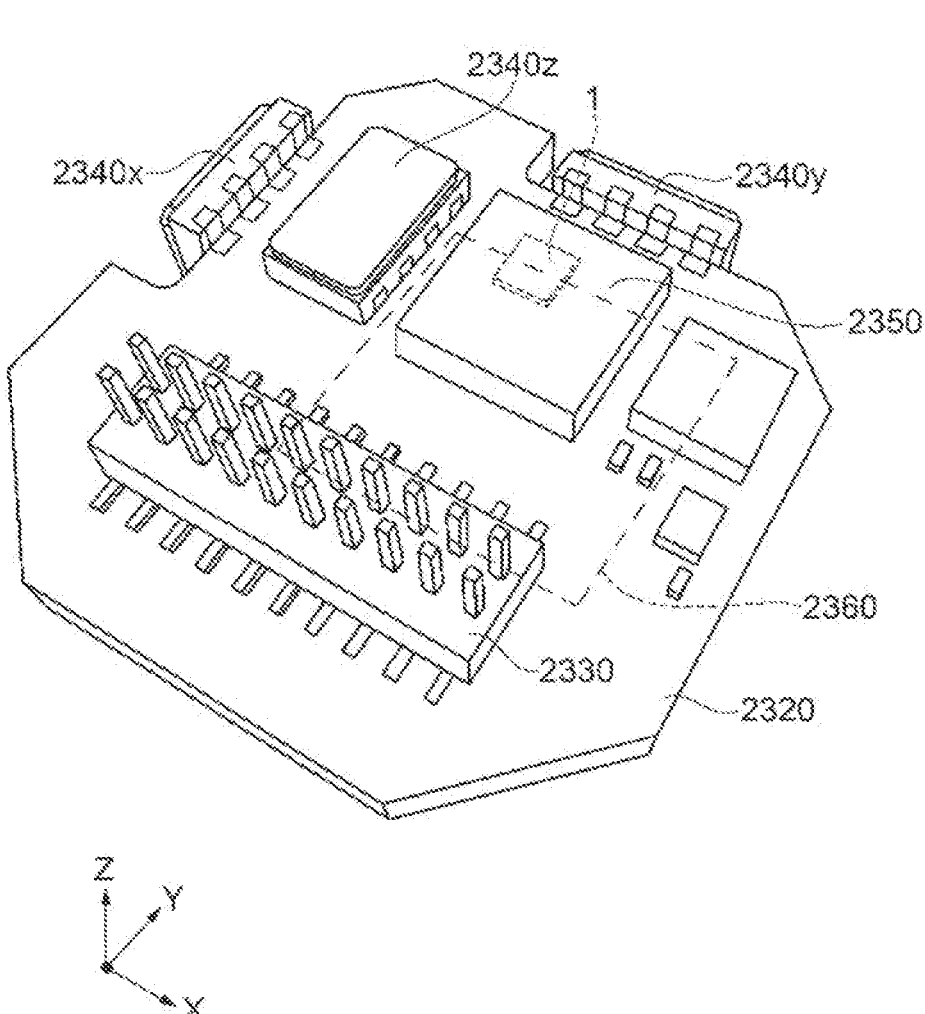
FIG. 21 is a perspective view of a circuit board of the physical quantity sensor.

As shown in FIG. 21, the connector 2330, an angular velocity sensor 2340z detecting an angular velocity around the Z-axis, an acceleration sensor unit 2350 detecting accelerations in the respective axial directions of the X-axis, the Y-axis, and the Z-axis, etc. are mounted on the upper surface of the circuit board 2320. Further, an angular velocity sensor 2340x detecting an angular velocity around the X-axis and an angular velocity sensor 2340y detecting an angular velocity around the Y-axis are mounted on side surfaces of the circuit board 2320.

The acceleration sensor unit 2350 includes at least the MEMS device 1 that may measure the acceleration in the Z-axis direction described in FIG. 1 etc. and may detect an acceleration in one axial direction or accelerations in two axial directions or three axial directions as necessary. Note that the angular velocity sensors 2340x, 2340y, 2340z are not particularly limited, but e.g., vibration gyro sensors using Coriolis forces may be used.

A control IC 2360 is mounted on the lower surface of the circuit board 2320. The control IC 2360 as a control unit performing control based on a detection signal output from the MEMS device 1 is e.g., an MCU (Micro Controller Unit) and contains a memory unit including a non-volatile memory, an A/D converter, etc. and controls the respective parts of the inertial measurement unit 2000. Note that other electronic components are mounted on the circuit board 2320.

As described above, the inertial measurement unit 2000 of the embodiment includes the MEMS device 1 and the control IC 2360 as the control unit performing control based on the detection signal output from the MEMS device 1. According to the inertial measurement unit 2000, the acceleration sensor unit 2350 including the MEMS device 1 is used, and the inertial measurement unit 2000 that may enjoy the effects of the MEMS device 1 and realize higher accuracy or the like may be provided.

Note that the inertial measurement unit 2000 is not limited to the configuration in FIGS. 20 and 21. For example, the inertial measurement unit 2000 may have a configuration in which the angular velocity sensors 2340x, 2340y, 2340z are not provided, but only the MEMS device 1 is provided as the inertial sensor. In this case, the inertial measurement unit 2000 may be realized by housing of, e.g., the MEMS device 1 and the control IC 2360 realizing the control unit in a package as a container.

As described above, the MEMS device of the embodiment includes a substrate, a fixed electrode portion, a movable body, a fixed electrode fixing portion, a wiring structure, and a first wire. The fixed electrode portion is fixed relative to the substrate. The movable body is movable relative to the substrate. The fixed electrode fixing portion is electrically coupled to the fixing electrode portion. The wiring structure is provided in the same layer as those of the movable body and the fixed electrode portion with respect to the substrate. The first wire has one end coupled to the fixed electrode fixing portion. The wiring structure is at least provided in an opening part of the movable body, and the first wire is wired on the wiring structure via an insulating film and routed out of the movable body through the opening part of the movable body.

According to the embodiment, in the MEMS device formed using the SOI process or the like, the first wire is provided on the wiring structure via the insulating film, the anchor of the fixed electrode portion is located inside of the movable body, and the wire may be routed from within the opening part provided in the movable body MB. Accordingly, the wiring efficiency may be increased and the area assigned to the probe electrodes in the plan view may be increased. Therefore, downsizing is easier than that of the MEMS device 1 having the same size and the same sensitivity.

In the embodiment, the wiring structure is set at a ground potential.

According to the configuration, degradation of a capacitance offset due to generation of an unnecessary capacitance between the fixed electrode portion and the movable electrode portion may be suppressed and high-accuracy physical quantity detection can be performed. Further, the potential of the wiring structure is maintained constantly at a fixed potential, the respective wires are less susceptible by fluctuations of the potential of the wiring structure, and the high-accuracy physical quantity detection may be realized.

The MEMS device of the embodiment includes a shield structure provided to surround the movable body and set at the ground potential. The wiring structure is integrally formed with the shield structure.

According to the configuration, external electric and magnetic influences on the MEMS device may be blocked and the high-accuracy physical quantity detection can be performed. Further, the wiring structure is integrally formed with the shield structure, and thereby, the potential of the wiring structure may be constantly fixed to the ground potential. The first wire, the second wire, etc. provided in the upper layer of the wiring structure are electrically stabilized and the high-accuracy physical quantity detection can be performed.

In the embodiment, the wiring structure is set at a same potential as that of the movable body.

According to the configuration, the movable electrode and the wiring structure are at the same potential, and thereby, no capacitance is generated between the movable electrode and the wiring structure, an unnecessary capacitance component parasitic in the capacitance in the probe electrodes may be reduced, and the high-accuracy MEMS device may be realized.

The MEMS device of the embodiment includes a stopper structure provided to surround the movable body, set at the same potential as that of the movable body, and serving as a stopper for the movable body. The wiring structure is integrally formed with the stopper structure.

According to the configuration, an unnecessary electrostatic force is not generated between the the stopper structure and the movable body and the high-accuracy detection can be performed. Further, the stopper structure integrally with the wiring structure is provided, and thereby, the number of intersections of the respective wires and the routing lengths may be reduced, and the wiring efficiency is increased and the higher sensitivity and downsizing of the device may be realized.

The MEMS device of the embodiment includes a fixing portion electrically coupled to the movable body, and a movable electrode terminal. The fixing portion is electrically coupled to the wiring structure. The movable electrode terminal is electrically coupled to the fixing portion via the wiring structure and the stopper structure.

According to the configuration, the movable body, the fixing portion, and the wiring structure are electrically coupled and contact to the movable electrode may be made from the wiring structure. Further, the movable electrode terminal is provided, and thereby, voltage control of the movable electrode can be performed from the terminal.

The MEMS device of the embodiment includes a stopper structure and a shield structure. The stopper structure is provided to surround the movable body and serving as a stopper for the movable body. The shield structure is provided to surround the stopper structure. The wiring structure is integrally formed with the stopper structure or the shield structure.

According to the configuration, the device may be downsized by simplification of the second wire making contact with the movable body. Further, the wiring structure and the shield structure are integrally formed, and thereby, the potential of the wiring structure may be constantly fixed to the ground potential, the respective wires provided in the upper layer of the wiring structure are electrically stabilized, and the high-accuracy physical quantity detection can be performed.

The MEMS device of the embodiment includes a supporting beam and a stopper structure. The supporting beam has one end coupled to the movable body. The stopper structure is coupled to another end of the supporting beam, provided to surround the movable body, and serves as a stopper for the movable body.

According to the configuration, the movable body may be coupled to the substrate by the stopper structure without provision of the fixing portion fixing the movable body. Accordingly, it is not necessary to separately provide the fixing portion and downsizing of the MEMS device can be realized. Further, the movable body is electrically coupled to the stopper structure, and thereby, contact may be made from any point around the movable body and the degree of freedom of wiring design may be increased.

The MEMS device of the embodiment includes a movable electrode terminal electrically coupled to the stopper structure.

According to the configuration, the routing of the respective wires is further simplified, the wiring efficiency is increased, and the MEMS device may be downsized.

The MEMS device of the embodiment includes a fixing portion electrically coupled to the movable body, and a second wire having one end coupled to the fixing portion. The second wire is wired on the wiring structure via the insulating film and routed out of the movable body through the opening part of the movable body.

According to the configuration, the voltage of the movable electrode of the movable body may be controlled by a voltage applied to the second terminal The MEMS device of the embodiment includes a supporting beam having one end coupled to the fixing portion and another end coupled to the movable body. The fixing portion is electrically coupled to the movable body via the supporting beam.

According to the configuration, the supporting beam twists according to an acceleration applied from outside or the like, and thereby, the movable body may make a see-saw motion with respect to the substrate.

The MEMS device of the embodiment includes a fixed electrode terminal coupled to the first wire, and a movable electrode terminal coupled to the second wire.

According to the configuration, capacitances in the respective detection parts may be detected by the fixed electrode terminal and the movable electrode terminal.

In the embodiment, the fixed electrode portion includes a fixed electrode facing a movable electrode provided in the movable body.

According to the configuration, in the MEMS device, a probe detecting a physical quantity may be formed.

In the embodiment, the movable body, the fixed electrode portion, and the wiring structure are formed using silicon.

According to the configuration, the movable body and the fixed electrode portion may be formed using silicon having conductivity, and the physical quantity such as a capacitance can be detected in the probes. Further, the wiring structure may be formed using silicon having conductivity, and the potential of the lower portions of the respective wires may be fixed to a certain potential by control of the potential of the wiring structure. Therefore, propagations of the electrical signals of the respective wires may be stabilized and the high-accuracy physical quantity detection can be performed.

The embodiment relates to an inertial measurement unit including the MEMS device and a control unit performing control based on a detection signal output from the MEMS device.

As above, the embodiment is explained in detail and a person skilled in the art could easily understand that many modifications can be made without substantially departing from the new matter and the effects of the present disclosure. Accordingly, all of these modified examples fall within the scope of the present disclosure. For example, in the specification or the drawings, terms described with different broader terms or synonymous terms at least once may be replaced by the different terms in any part of the specification or the drawings. Further, all combinations of the embodiment and the modified examples fall within the scope of the present disclosure. Furthermore, configurations, operations, etc. of the MEMS device and the inertial measurement unit are not limited to those described in the embodiment, but various modifications can be made.

What is claimed is:

1. A MEMS device comprising:
a substrate;
a fixed electrode portion fixed relative to the substrate;
a movable body movable relative to the substrate;
a fixed electrode fixing portion electrically coupled to the fixed electrode portion;
a wiring structure provided in a same layer as those of the movable body and the fixed electrode portion with respect to the substrate; and
a first wire having one end coupled to the fixed electrode fixing portion, wherein
the wiring structure is at least provided in an opening part of the movable body, and
the first wire is wired on the wiring structure via an insulating film and routed out of the movable body through the opening part of the movable body.

2. The MEMS device according to claim 1, wherein the wiring structure is set at a ground potential.

3. The MEMS device according to claim 2, further comprising a shield structure provided to surround the movable body and set at the ground potential, wherein
the wiring structure is integrally formed with the shield structure.

4. The MEMS device according to claim 1, wherein
the wiring structure is set at a same potential as that of the movable body.

5. The MEMS device according to claim 4, further comprising a stopper structure provided to surround the movable body, set at the same potential as that of the movable body, and serving as a stopper for the movable body, wherein
the wiring structure is integrally formed with the stopper structure.

6. The MEMS device according to claim 5, further comprising:
a fixing portion electrically coupled to the movable body; and
a movable electrode terminal, wherein
the fixing portion is electrically coupled to the wiring structure, and
the movable electrode terminal is electrically coupled to the fixing portion via the wiring structure and the stopper structure.

7. The MEMS device according to claim 1, further comprising:
a stopper structure provided to surround the movable body and serving as a stopper for the movable body; and
a shield structure provided to surround the stopper structure, wherein
the wiring structure is integrally formed with the stopper structure or the shield structure.

8. The MEMS device according to claim 1, further comprising:
a supporting beam having one end coupled to the movable body; and
a stopper structure coupled to another end of the supporting beam, provided to surround the movable body, and serving as a stopper for the movable body.

9. The MEMS device according to claim 8, further comprising a movable electrode terminal electrically coupled to the stopper structure.

10. The MEMS device according to claim 1, further comprising:
a fixing portion electrically coupled to the movable body; and
a second wire having one end coupled to the fixing portion, wherein
the second wire is wired on the wiring structure via the insulating film and routed out of the movable body through the opening part of the movable body.

11. The MEMS device according to claim 10, further comprising a supporting beam having one end coupled to the fixing portion and another end coupled to the movable body, wherein
the fixing portion is electrically coupled to the movable body via the supporting beam.

12. The MEMS device according to claim 10, further comprising:
a fixed electrode terminal coupled to the first wire; and
a movable electrode terminal coupled to the second wire.

13. The MEMS device according to claim 1, wherein
the fixed electrode portion includes a fixed electrode facing a movable electrode provided in the movable body.

14. The MEMS device according to claim 1, wherein the movable body, the fixed electrode portion, and the wiring structure are formed using silicon.

15. An inertial measurement unit comprising:

the MEMS device according to claim 1; and a control unit performing control based on a detection signal output from the MEMS device.

\* \* \* \* \*